United States Patent [19]

Ookawa et al.

[11] Patent Number: 5,696,746
[45] Date of Patent: Dec. 9, 1997

[54] DISK APPARATUS

[75] Inventors: Eiichi Ookawa, Yokohama; Hiroto Nishida, Ishikawa-ken, both of Japan

[73] Assignee: Matsushita Electric Industrial Co., Ltd., Osaka, Japan

[21] Appl. No.: 447,030

[22] Filed: May 22, 1995

[30] Foreign Application Priority Data

| May 25, 1994 | [JP] | Japan | 6-111070 |
| May 25, 1994 | [JP] | Japan | 6-111232 |
| May 25, 1994 | [JP] | Japan | 6-111233 |

[51] Int. Cl.[6] ............................................ G11B 17/04
[52] U.S. Cl. ............................................ 369/77.2
[58] Field of Search ............................. 369/77.2, 77.1, 369/75.2, 258; 360/99.02, 99.03, 99.06, 99.07

[56] References Cited

U.S. PATENT DOCUMENTS

| 4,896,312 | 1/1990 | Odawara et al. | 369/77.2 |
| 4,992,896 | 2/1991 | Inoue et al. | 360/99.06 |

FOREIGN PATENT DOCUMENTS

| 0293150 A2 A3 | 11/1988 | European Pat. Off. |
| 0539199 A2 A3 | 4/1993 | European Pat. Off. |
| 0571227 A2 A3 | 11/1993 | European Pat. Off. |
| 0644539 A2 | 3/1995 | European Pat. Off. |
| 01159861 | 6/1989 | Japan | 369/77.2 |
| 01260661 | 10/1989 | Japan | 369/77.2 |

*Primary Examiner*—Robert S. Tupper
*Assistant Examiner*—William R. Korzuch

[57] ABSTRACT

A disk apparatus is disclosed. A movable chassis assembly having a turntable and a pickup head is detachably supported on elastic members by a stationary chassis assembly with the lock mechanism of the stationary chassis assembly engaged with lock pins disposed on the movable chassis. A holder located on the movable chassis assembly for holding a disk cartridge to load or eject the disk cartridge is transported by a loader located on the stationary chassis assembly in a predetermined transport direction. Pin driving means located in the loader disengages lock pins when the lock mechanism is touched by the pin driving means at the end of the loading operation of the disk cartridge. A pair of pivoting cross links are connected at their crossings by a support pin that is engaged with a first guide slot in the stationary chassis assembly. One end of each of the pair of cross links is slidably engaged with a guide slot in the loader. The other end of each of the pair of cross links is slidably engaged with a guide slot in the stationary chassis. This arrangement eliminates variations in the load during loading and ejecting operations. A stable operation of the disk apparatus is thus assured. The disk apparatus prevents a double insertion of cartridges and an incorrect insertion, freeing the cartridge and disk apparatus from physical damage.

1 Claim, 38 Drawing Sheets

FIG. 36
FIG. 38
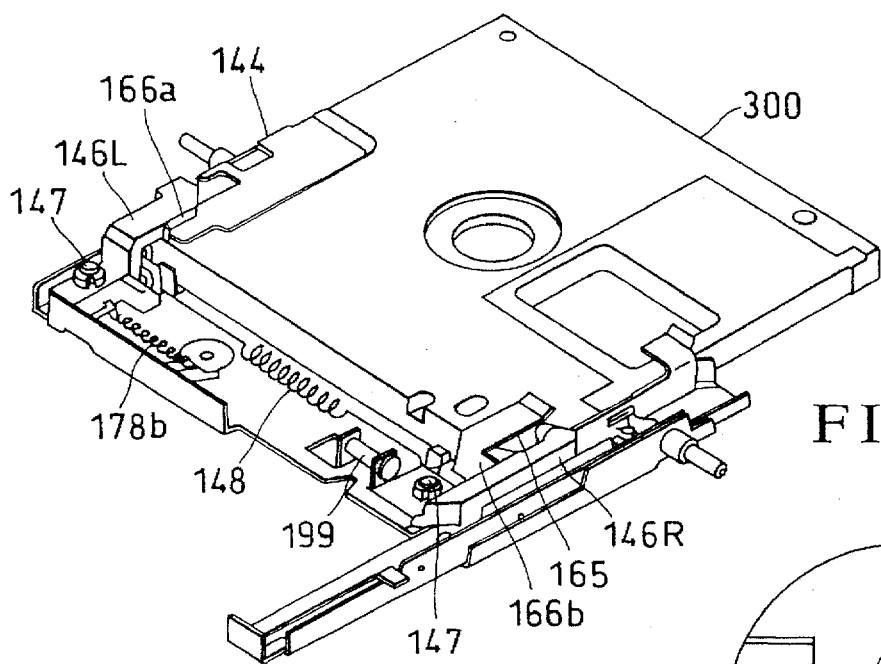
FIG. 37
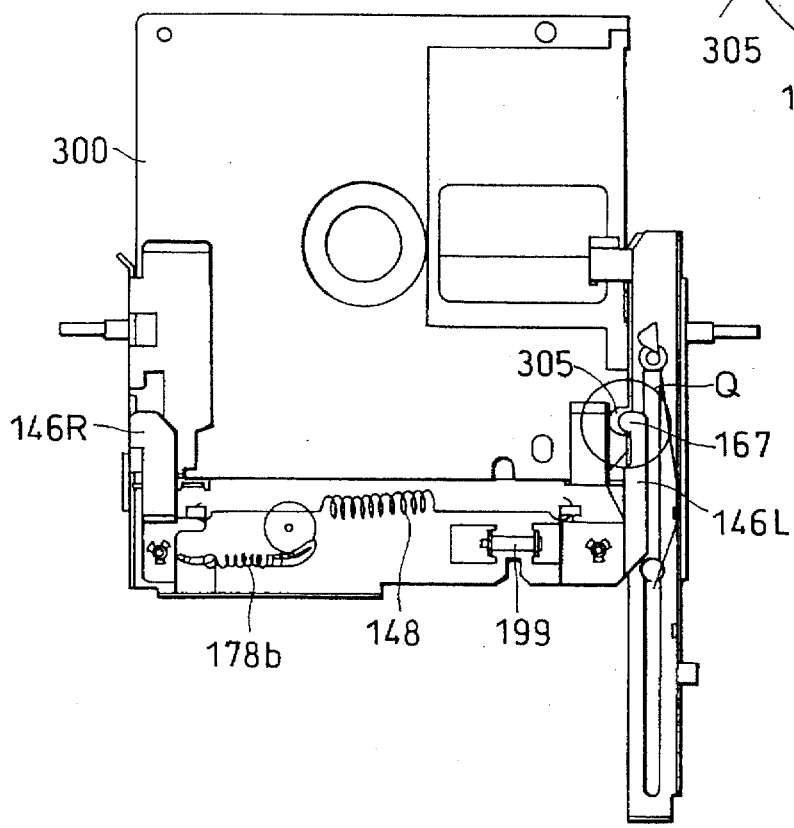

DISK APPARATUS

BACKGROUND OF THE INVENTION

1. Field of the Invention

The present invention relates to a magneto-optical disk apparatus for recording and reproducing a data storage disk in a minidisk cartridge.

2. Description of the Prior Art

Some disk cartridges that have been recently proposed are composed of a data storage disk housed in a protective cartridge case. An example of such disk cartridges is a minidisk cartridge of magneto-optical recording type. As shown in FIGS. 47 through 50, such a disk cartridge (hereinafter referred to as simply a "cartridge") 300 comprises a data storage disk 302 housed in a cartridge case 301, a disk access window 303 disposed on one or two side portions of the cartridge case 301, and a slide shutter 304 for opening or closing the disk access window 303. The cartridge case 301 has cartridge grip notches 305 formed on the front-right and front-left side portions of the rear surface thereof. The cartridge case 301 has also two grooves 306, each longitudinally extending on the right end face and left end face of the case 301. A shutter locking member which is not shown and which is urged toward the left groove 306 by a spring (not shown) is located mid-way of the left-groove 306, and the shutter locking member can be retracted. A locking pawl part 307 of the slide shutter 304 is adapted to be engaged with the shutter locking member. A shutter control hole 308 is formed in the right end face of the slide shutter 304.

A disk apparatus has been used for recording and reproducing a storage disk in the above-mentioned cartridge 300.

Such a disk apparatus has a cross-link mechanism to stabilize the operation of a loader during a loading or ejecting operation of the cartridge. The cross-link mechanism has two cross-links which are mutually pivotally connected together at a crossing point in the middle part thereof, and the right end portions or left end portions of these cross-links are connected to the stationary chassis and the loader as the fulcrum.

The above-mentioned disk apparatus has a risk that the cartridge 300 may be inserted in an incorrect direction.

In the above-mentioned disk apparatus, the fulcrum of the cross-links exists either on the left side or right side. If the transport stroke of the loader is set to be large, the operation of the disk unit becomes unstable. The crossing point between the middle parts of the two cross links shifts, transverse to the transport direction. This gives rise to variations in the load at the motor driving point and results in unreliable operation (variations in motor speed and a halt in the operation of the motor).

Even after the loading operation of the cartridge 300, another cartridge 300 can be partially inserted. A double insertion of cartridges 300 may damage the disk apparatus.

The cartridge 300 may be inserted in an incorrect direction. An incorrectly inserted cartridge may damage the disk apparatus.

SUMMARY OF THE INVENTION

The present invention has been developed in view of the above-mentioned problems. It is an object of the present invention to provide a disk apparatus that operates stably and is free from variations in load during a loading or ejecting operation of a cartridge.

It is another object of the present invention to provide a disk apparatus which is free from a cartridge double-insertion in succession to a first insertion and free from a possible resulting damage to the apparatus.

It is yet another object of the present invention to provide a disk apparatus wherein no loading is activated with a cartridge set in an incorrect insertion direction, no physical damage takes place on the cartridge or the apparatus, and the insertion of the cartridge is recognized.

To achieve the above-mentioned objects, the present invention in its first aspect, comprises a stationary chassis assembly, a movable chassis assembly supported through the intermediary of elastic members to the stationary chassis assembly and carrying thereon a turntable and a pickup head, a mechanical lock mechanism provided on the stationary chassis assembly, for releasably gripping lock pins of the movable chassis assembly to secure the movable chassis assembly to the stationary chassis assembly, a holder provided on the movable chassis assembly, for holding a disk cartridge to load or eject the disk cartridge, a loader provided on the stationary chassis assembly, for transporting the holder in a predetermined transport direction, pin driving means provided on the loader, for disengaging lock pins locked by the mechanical lock mechanism by touching the mechanical lock mechanism at the end of the loading operation of the disk cartridge, and for causing the mechanical lock mechanism to lock the lock pins by touching the mechanical lock mechanism at the beginning of the ejecting operation of the disk cartridge, chassis side guide slot formed in a planar portion of the stationary chassis assembly, orthogonal to the transport direction, loader side guide slots formed in said loader, orthogonal to the transport direction, and a pair of pivoting cross links connected at a cross point in their middle portions by a fulcrum pin, and slidably engaged at one end thereof with the loader side guide slots in the loader, and at the other end thereof with the chassis side guide slots in the stationary chassis assembly, the fulcrum pin being slidably engaged with a guide slot formed in the stationary chassis assembly.

The present invention in its second aspect comprises a stationary chassis assembly, a movable chassis assembly supported through the intermediary of elastic members to the stationary chassis assembly and carrying thereon a turntable and a pickup head, a mechanical lock mechanism provided on the stationary chassis assembly and releasably gripping lock pins of the movable chassis assembly to secure the movable chassis assembly to the stationary chassis assembly, a holder provided on the movable chassis assembly, for holding a disk cartridge to load or eject the disk cartridge, a loader provided on the stationary chassis assembly, for transporting the holder in a predetermined transport direction, and pin driving means located on the loader, for disengaging lock pins locked by the mechanical lock mechanism by touching the mechanical lock mechanism at the end of the loading operation of the disk cartridge and for locking the lock pins to the mechanical lock mechanism by touching the mechanical lock mechanism at the beginning of the ejecting operation of the disk cartridge, whereby the stationary chassis assembly is provided with a cartridge double-insertion preventing mechanism in which a cartridge double-insertion preventing member is positioned in front of a cartridge entry opening in the stationary chassis assembly after the loading operation of the disk cartridge by the holder.

The cartridge double-insertion preventing mechanism may comprise a first connecting bar actuated by the shifting of the loader, a second connecting bar pivoted by the actuation of the first connection bar against the urging action of a spring, and a protector that is guided along a guide slot formed on the planar portion of the stationary chassis assembly by the pivotal motion of the second connecting bar in order to move a double-insertion preventing pin forward of the cartridge entry opening.

The present invention comprises a stationary chassis assembly, a movable chassis assembly supported through the intermediary of elastic members by the stationary chassis assembly and carrying a turntable and a pickup head, a mechanical lock mechanism provided on the stationary chassis assembly and releasably gripping lock pins of the movable chassis assembly to secure the movable chassis assembly to the stationary chassis assembly, a holder provided on the movable chassis assembly, for holding a disk cartridge to load or eject the disk cartridge, a loader provided on the stationary chassis assembly, for transporting the holder in a predetermined transport direction, and pin driving means provided on the loader, for disengaging lock pins locked by the mechanical lock mechanism by touching the mechanical lock mechanism at the end of the loading operation of the disk cartridge and for locking the lock pins to the mechanical lock mechanism by touching the mechanical lock mechanism at the beginning of the ejecting operation of the disk cartridge, an abutment portion that abuts the disk cartridge when the disk cartridge is erroneously inserted, and a cartridge correct-insertion sensor mechanism that recognizes a correct cartridge insertion when a sensor switch is activated by a correctly inserted cartridge.

The correct-insertion sensor mechanism may comprise a sensor plate that is moved by touching the end portion of the disk cartridge when the disk cartridge is inserted into the holder, a sensor portion having a sensor lever that is pivoted by the movement of the sensor plate overcoming the a spring, a sensor coupling lever provided on the stationary chassis assembly and operated in association with the operation of the sensor lever overcoming a spring, and a sensor switch lever pivoted by the movement of the sensor coupling lever to activate a sensor switch.

In the above-mentioned arrangement, the cross links slide at each of their ends and the fulcrum pin that connects the pair of cross links at their crossing portions slides along the guide slot in the stationary chassis assembly. The crossing portions of the middle parts of the pair of cross links are thus free from transverse motion with the loader moving in its transport direction. This stabilizes the load at the motor driving point. Disadvantages such as variations in motor speed or a halt in motor rotation are avoided. Stable operation of the motor is thus assured.

Once the cartridge is loaded, an insertion of additional cartridge is prevented. Any physical damage involved in an attempt to insert the additional cartridge is thus avoided.

Therefore, when an attempt is made to insert the disk cartridge in its incorrect direction, the abutment portion interferes with the disk cartridge rendering cartridge insertion impossible. Loading operation is not activated with the cartridge disk seated in its incorrect alignment. Any damage to the disk cartridge or the apparatus is prevented.

Since the cartridge correct-insertion sensor mechanism is provided, a correct cartridge insertion is recognized when the sensor switch is activated by a correctly inserted cartridge.

BRIEF DESCRIPTION OF THE DRAWINGS

FIG. 4b is a view in the direction of the arrow X in FIG. 4a.

FIG. 36 is a perspective view showing the holder with the cartridge loaded as viewed from below.

FIG. 37 is a plan view showing the holder with the cartridge loaded as viewed from below.

FIG. 38 is an enlarged view showing the portion Q in FIG. 37.

DESCRIPTION OF THE PREFERRED EMBODIMENTS

Figure 1:
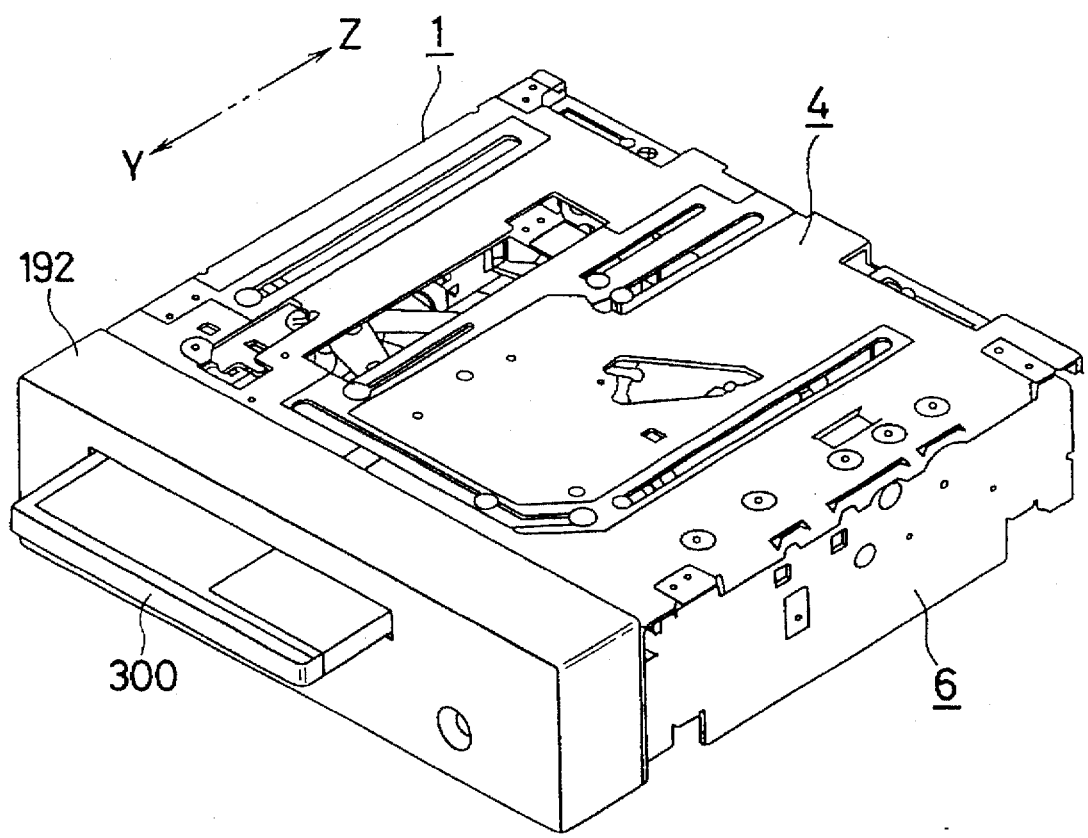
FIG. 1 is a perspective view showing the disk apparatus according to the present invention with certain components omitted.
Figure 2:
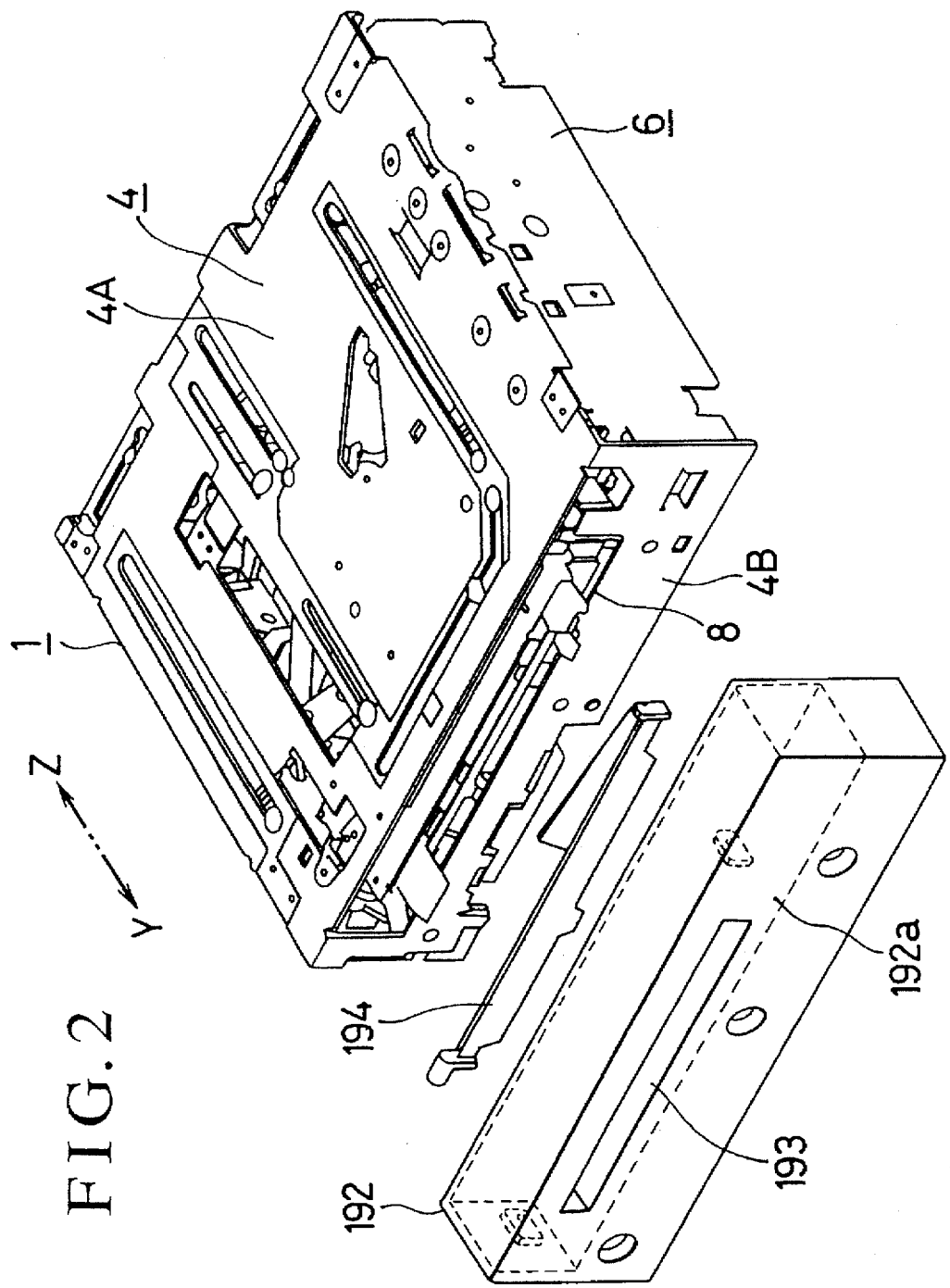
FIG. 2 is a perspective view showing the disk with its front cover detached.
Figure 3:
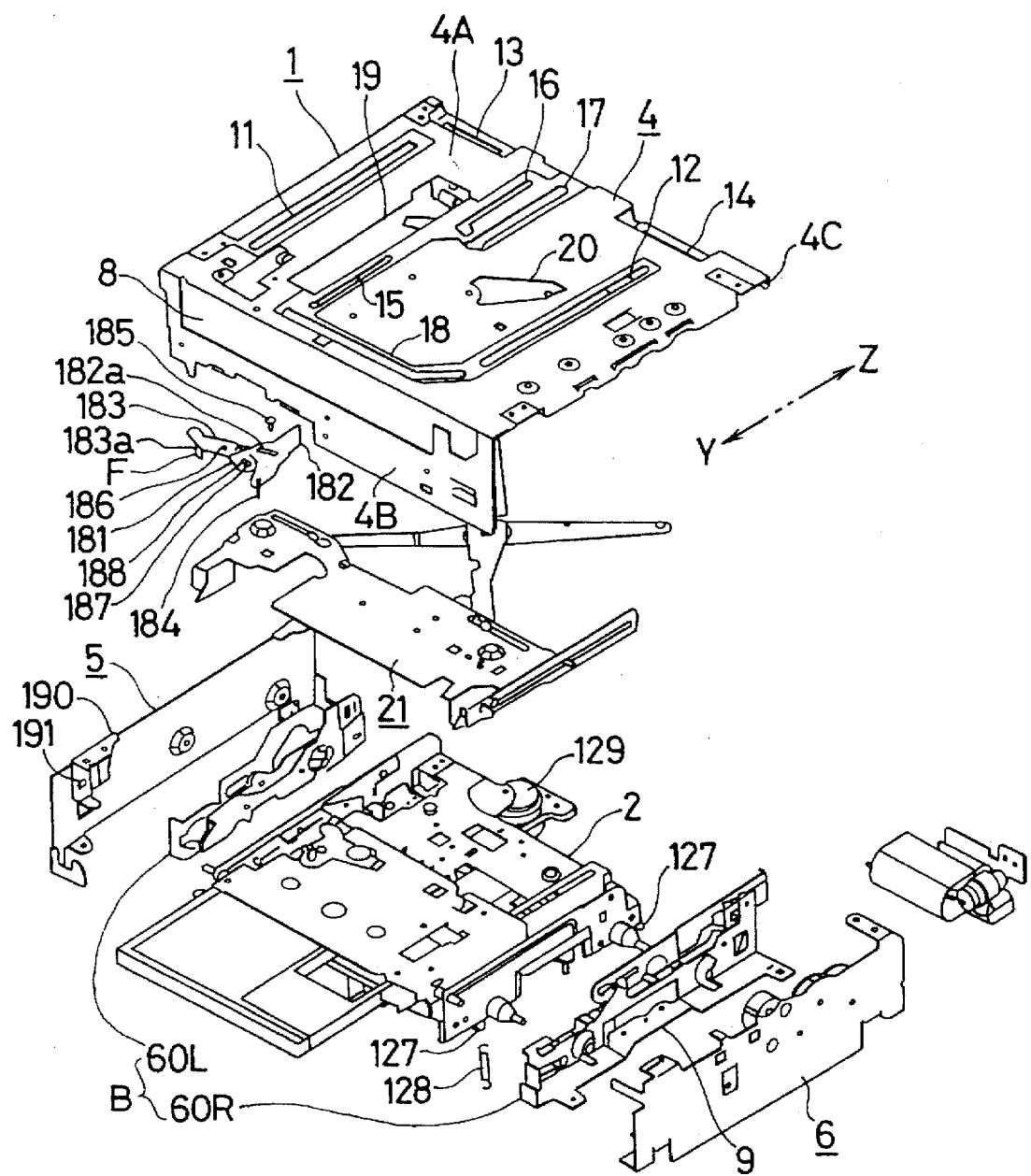
FIG. 3 is an exploded perspective view showing the disk.

Referring now to the drawings, an embodiment of the present invention is discussed. FIG. 1 is a perspective view showing the disk apparatus according to the present invention with certain components omitted. FIG. 2 is a perspective view showing the disk apparatus of FIG. 2 with its front cover disassembled. FIG. 3 is an exploded perspective view showing the disk apparatus. The legend Y indicates the front side of the disk apparatus and the legend Z indicates the back side of the disk apparatus, throughout the drawings.

Figure 5:
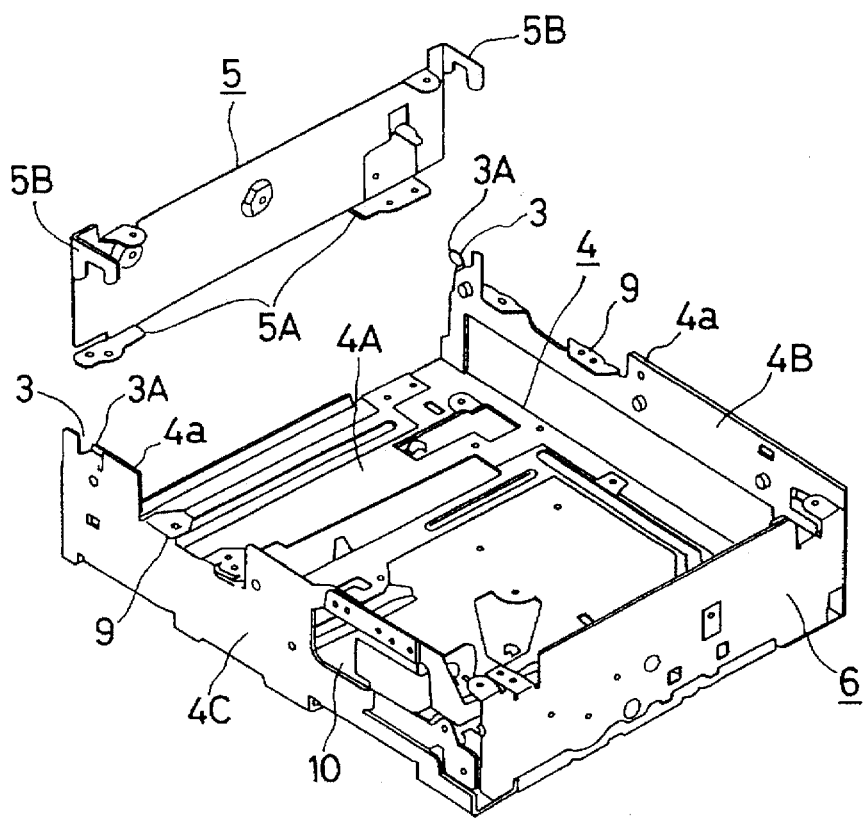
FIG. 5 is an exploded perspective view showing the stationary chassis assembly of the disk.
Figure 6:
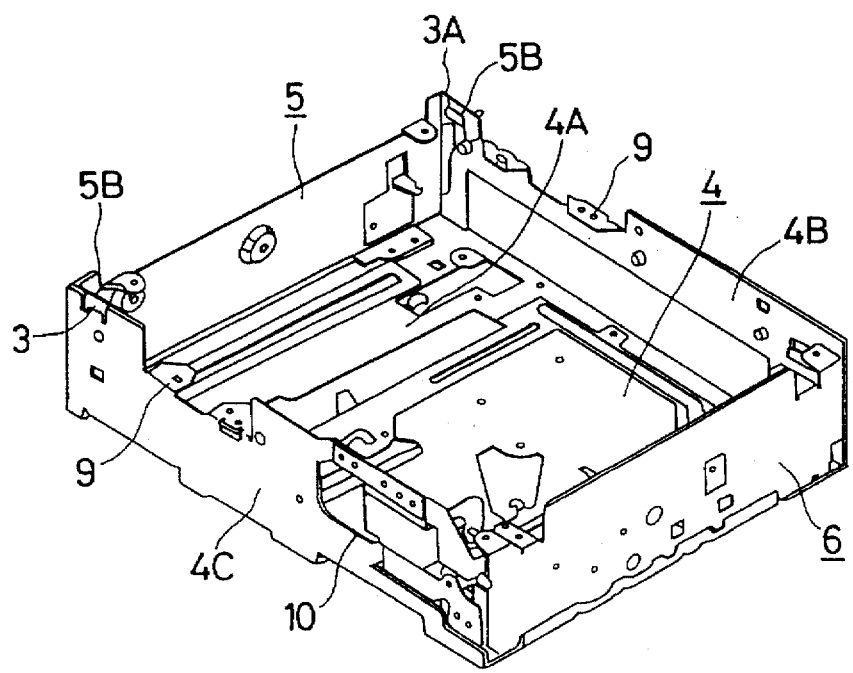
FIG. 6 is a perspective view showing the underside of the stationary chassis assembly.

As shown in FIG. 3, the disk apparatus of the present invention is formed of a stationary chassis assembly 1 and a suspension chassis 2 as a movable chassis assembly. The stationary chassis assembly 1 comprises an upper chassis 4. Side chassis 5 and 6 are attached to the right and left sides of the upper chassis 4. The upper chassis 4, integrally made of a top portion 4A, a front portion 4B and a rear portion 4C, is formed of a single sheet metal. A lug 3A is formed by cutting and raising the bottom left edge 4a of each of the front portion 4A and the rear portion 4C as shown in FIG. 5. The locking recess 3 is constituted by the lug 3a and the bottom left corner 4a.

The left side chassis 5 has two mounting brackets 5A, each extending from each of the top end corners of the side chassis 5, and two locking hooks 5B, each extending from each of the bottom edges of the left and right sides of the side chassis 5. With the two locking hooks 5B engaged with the locking recesses 3, the side chassis 5 is rigidly attached to the upper chassis 4 by bolting its mounting brackets 5A onto the upper chassis 4. Thus, by engaging the hooks 5B with the recesses 3, the side chassis 5 and 6 are prevented from being displaced sideways.

The front portion 4B of the stationary chassis assembly 1 thus constructed has a cartridge entry opening 8. Each of the front portion 4B and the rear portion 4C has a damper support bracket 9 mounted on its bottom part. The rear portion 4C has on its right side an opening that forms a motor mounting portion 10.

The top portion 4A of the upper chassis 4 of the stationary chassis assembly 1 is provided with first and second guide slots 11, 12 extending longitudinally in parallel with each other and near the left and right side edge of the top portion 4a. The top portion 4A is also provided with third and fourth guide slots 13, 14 extending transversely at its rear edge, fifth, sixth and seventh guide slots 15, 16, 17 extending longitudinally in the intermediate part of the top portion 4A, and an eighth guide slot 18 which runs transversely in parallel with and near the front edge of the top portion 4A and which is substantially at right angles to the second guide slot 12. The eighth guide slot 18 is bent backward at a point on its way to the right. Furthermore, the top portion 4A of the upper chassis 4 has on its left side a first elongated opening 19 extending longitudinally, and on its right side a second substantially triangular opening 20.

Figure 4A:
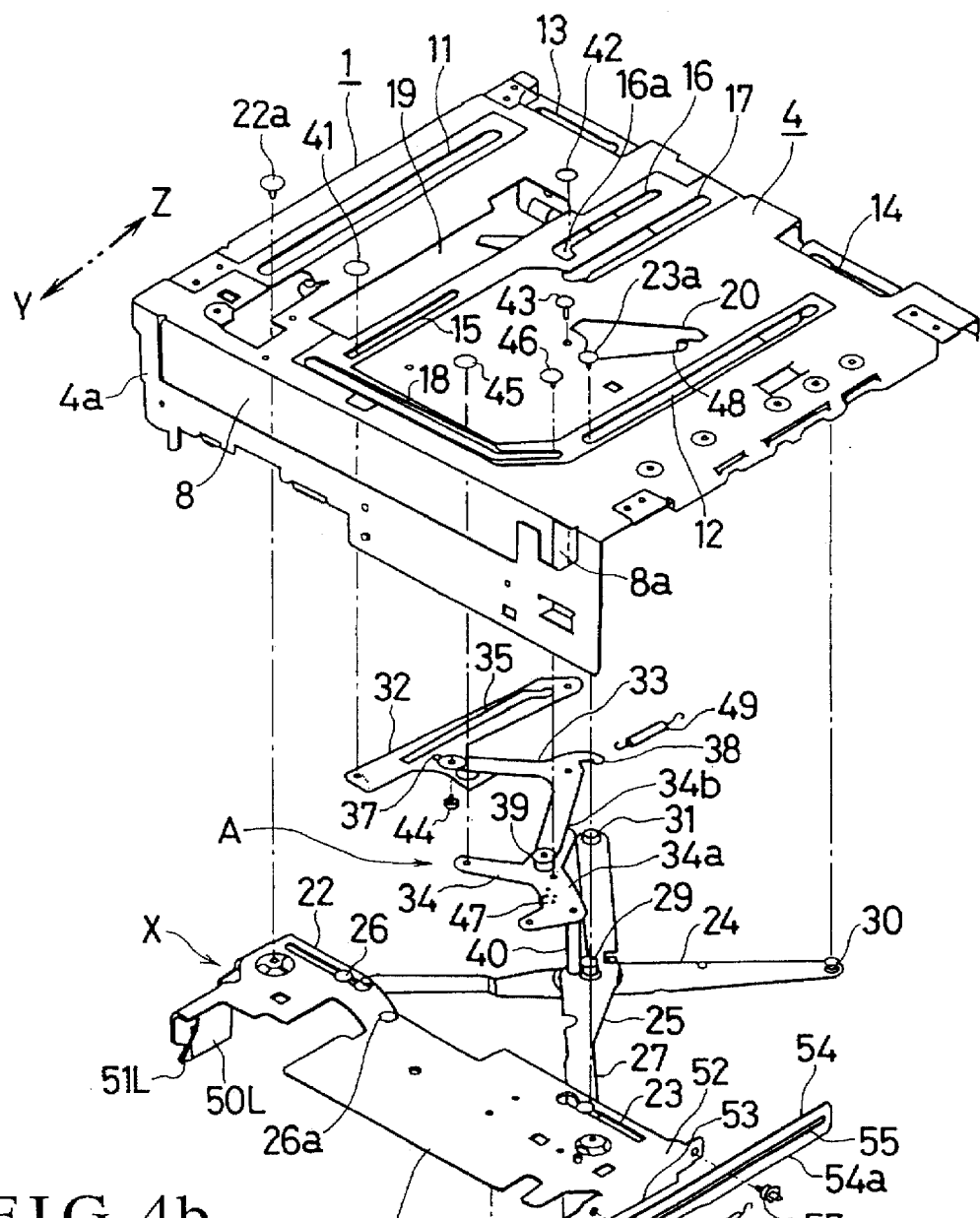
FIG. 4a is an exploded perspective view showing the stationary chassis assembly of the disk.
Figure 4B:
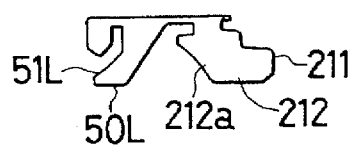
Figure 4B:
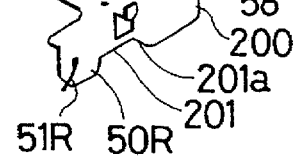

A first loader 21 is mounted inside the upper chassis 4 in a manner that the first loader 21 is longitudinally movable with its guide pins 22a, 23a slidable along the first and second slots 11, 12, respectively. The first loader 21 has transverse slots 22, 23 in parallel with and near its right rear edge and left side rear edge, respectively. Furthermore, the first loader 21 has on its left end a holder pin locking portion 50L projected downward therefrom. The holder pin locking portion 50L has a notch 51L. Disposed behind the holder locking portion 50L are a locking release portion 211 and a cam portion 212 having a slant face 212a. These constitute the left pin driving means (FIG. 4b).

The first loader 21 has on its right end a rack portion 52 projected downward therefrom. The rack portion 52 has a rack 53. The rack portion 52 has a movable rack body 54 having a rack 54a. The movable rack bogy 54 is formed therein with a guide slot 55 extending longitudinally. The rack portion 52 has guide pins 56, 57 on its front and rear sides. These guide pins 56, 57 are slidably engaged with the guide slot 55, and the movable rack body 54 is thus longitudinally movably supported. The movable rack body 54 has on its front end a spring anchoring point 58, and a spring 59 is stretched between the anchoring point 58 and the end of the guide pin 56. The spring 59 urges the movable rack body 54 backward, keeping the movable rack body 54 integral with the rack portion 52 with the guide pin 56 pressed against the front end of the guide slot 55.

A second loader 21a is rigidly attached to bottom surface of the first loader 21 on its right hand side. These constitute a loader G. Projected downward from the right end of the second loader 21a are a holder pin locking portion 50R, a cam portion 201 having a slant face 201a, and a locking release portion 200. The holder pin locking portion 50R is provided with a locking notch 51R. The second loader 21a has a guide portion 203 for guiding a rear pin 199 of a holder 143 which will be discussed later. These components constitute the right pin driving means (FIG. 4b).

The guide pins 26, 27 inserted at the front ends of cross links 24, 25 are slidably engaged with the loader side guide slots 22, 23, respectively. The cross links 24, 25 cross each other at their centers. Located in the crossing portions of both is a fulcrum pin 29 which is slidably engaged with the seventh guide slot 17. The guide pin 30 provided at the rear end of the cross link 24 is slidably engaged with the fourth guide slot 14, and the guide pin 31 provided at the rear end of the cross link 25 is slidably engaged with the third guide slot 13.

Provided further inside the upper chassis 4 is a cartridge double-insertion preventing mechanism A. The cartridge double-insertion preventing mechanism A comprises a first connecting bar 32, a second connecting bar 33, and a protector 34. The first connecting bar 32 has a longitudinally extending slot 35. The slot 35 has a cam face portion 36 that deviates rightward on its rear portion. The first connecting bar 32 has a transversely extending guide slot 37. The second connecting bar 33 has a approximately right angle bend where a spring anchoring point 38 is provided. The protector 34 is constructed of an L-shaped protector body 34a. Behind the protector body 34a, the protector 34 has a piece part 34b which is provided with a longitudinally extending guide slot 39. A double-insertion preventing pin 40 as the double-insertion preventing member is rigidly attached to the front portion of the protector body 34a.

Guide pins 41, 42 are attached to the front and rear ends of the first connecting bar 32. The front-end guide pin 41 is slidably engaged with the fifth guide slot 15 and the rear-end guide pin 42 is slidably engaged with the sixth guide slot 16. The guide pin 26a which is rigidly attached onto the loader G is slidably engaged with the guide slot 35 of the first connecting bar 32.

The second connecting bar 33 is pivotally supported at its bend by the fulcrum pin 43 of the upper chassis 4. Attached to the left end of the second connecting bar 33 is a guide pin 44 which is slidably engaged with the guide slot 37 of the first connecting bar 32. Attached on both sides of the protector body 34a of the protector 34 are guide pins 45, 46 which are slidably engaged with the guide slot 18. The second connecting bar 33 has at its right end a guide pin 47 which is slidably engaged with the guide slot 39 of the protector 34. The cartridge entry opening 8 has on its right side a notch 8a where the double-insertion preventing pin 40 appears.

The spring anchoring point 38 formed on the bend of the second connecting bar 33 comes within the second opening 20, and a spring 49 is stretched between the spring anchoring point 38 and another spring anchoring point 48 located on the right edge of the second opening 20.

The stationary chassis assembly 1 is provided with a mechanical lock mechanism B. As shown in FIG. 3 and FIG. 17 through FIG. 28b, the mechanical lock mechanism B comprises a left mechanical lock unit 60L on the left side chassis 5 and a right mechanical lock unit 60R on the right side chassis 6.

Figure 18:
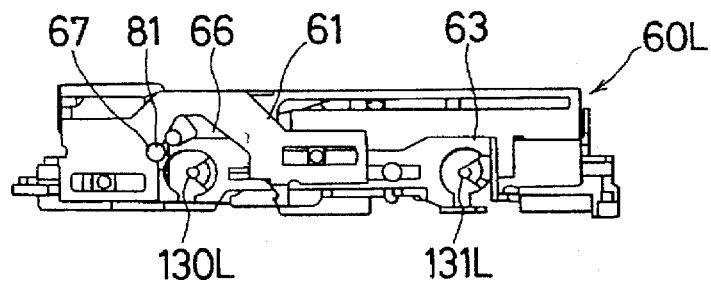
FIG. 18 is a view in the direction of the arrow T in FIG. 17.
Figure 19:
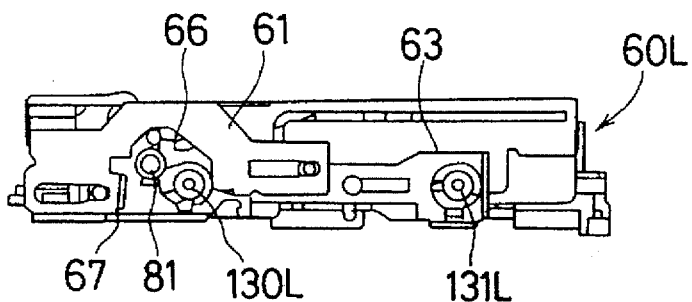
FIG. 19 is a side view showing the left mechanical lock unit in its active state.
Figure 20:
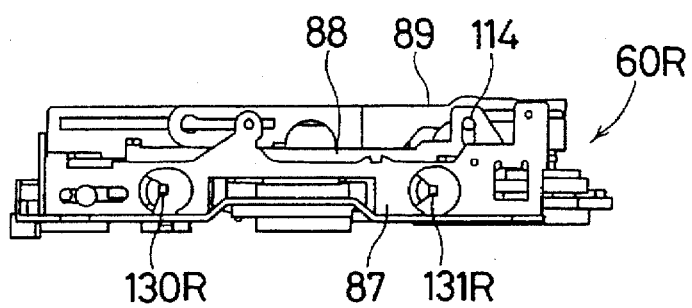
FIG. 20 is a view showing the left mechanical lock unit as viewed in the direction of the arrow U in FIG. 17.
Figure 21:
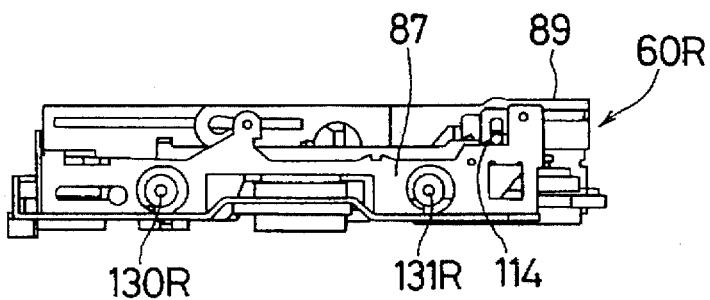
FIG. 21 is a side view showing the right mechanical lock unit in its active state.
Figure 22:
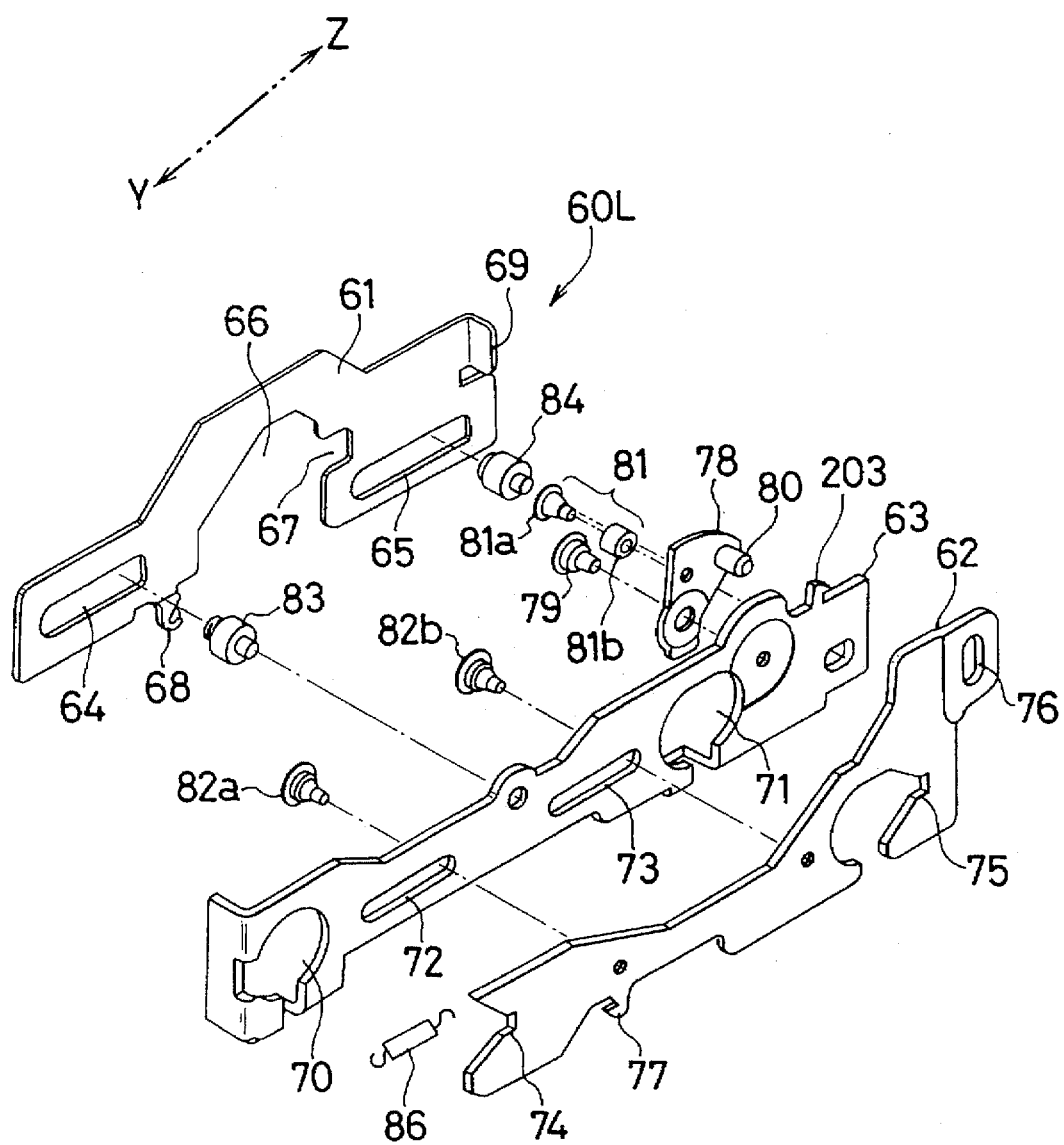
FIG. 22 is an exploded perspective view showing the left mechanical lock unit.

As shown in FIGS. 18, 19 and 22, the left mechanical lock unit 60L comprises a lock driving member 61, a lock plate 62 and a lock guide 63. The lock driving member 61 has longitudinally extending guide slots 64, 65 on its front and rear sides, and a cutout 66 on its middle portion. Disposed at the rear edge of the cutout 66 is a notch 67. A spring anchoring point 68 is formed on the front side of the bottom of the cutout 66. The lock driving member 61 has on its rear end an abutment portion 69 that projects transversely inwardly.

The lock guide 63 has substantially round openings 70, 71 on its front and rear portions, and longitudinally extending guide slots 72, 73. The lock plate 62 is provided with V-shaped lock portions 74, 75, a vertically extending guide slot 76 near its rear edge, and a spring anchoring point 77 on the front side of the bottom part of the lock plate 62.

A lock cam 78 is pivotally supported about a fulcrum 79 onto the rear portion of the lock guide 63. The lock cam 78 has a pin 80 on its inner side surface and a lock cam axis 81 on its outer side surface. The lock cam shaft 81 is made up of a fulcrum 81a and a cam follower 81b. The lock plate 62 has on its front and rear portions guide pins 82a, 82b which are slidably engaged with the respective guide slots 72, 73 of the lock guide 63. The lock plate 62 is thus longitudinally movable with respect to the lock guide 63. The pin 80 of the lock cam 78 is slidably engaged with the vertically extending guide slot 76 of the lock plate 62. The pivotal motion of the lock cam 78 moves the lock plate 62 back and forth.

Guide pins 83, 84 attached to the side chassis 5 are slidably engaged with the respective guide slots 64, 65 of the lock driving member 61, and thus the lock driving member 61 is attached to the side chassis 5 so as to be longitudinally movable. The lock guide 63 is rigidly attached to the guide pins 83, 84 by screws. The lock cam shaft 81 of the lock cam 78 is engaged in the notch 67 of the cutout 66 of the lock driving member 61. A spring 86 is stretched between the spring anchoring point 68 of the lock driving member 61 and the spring anchoring point 77 of the lock plate 62.

Figure 23:
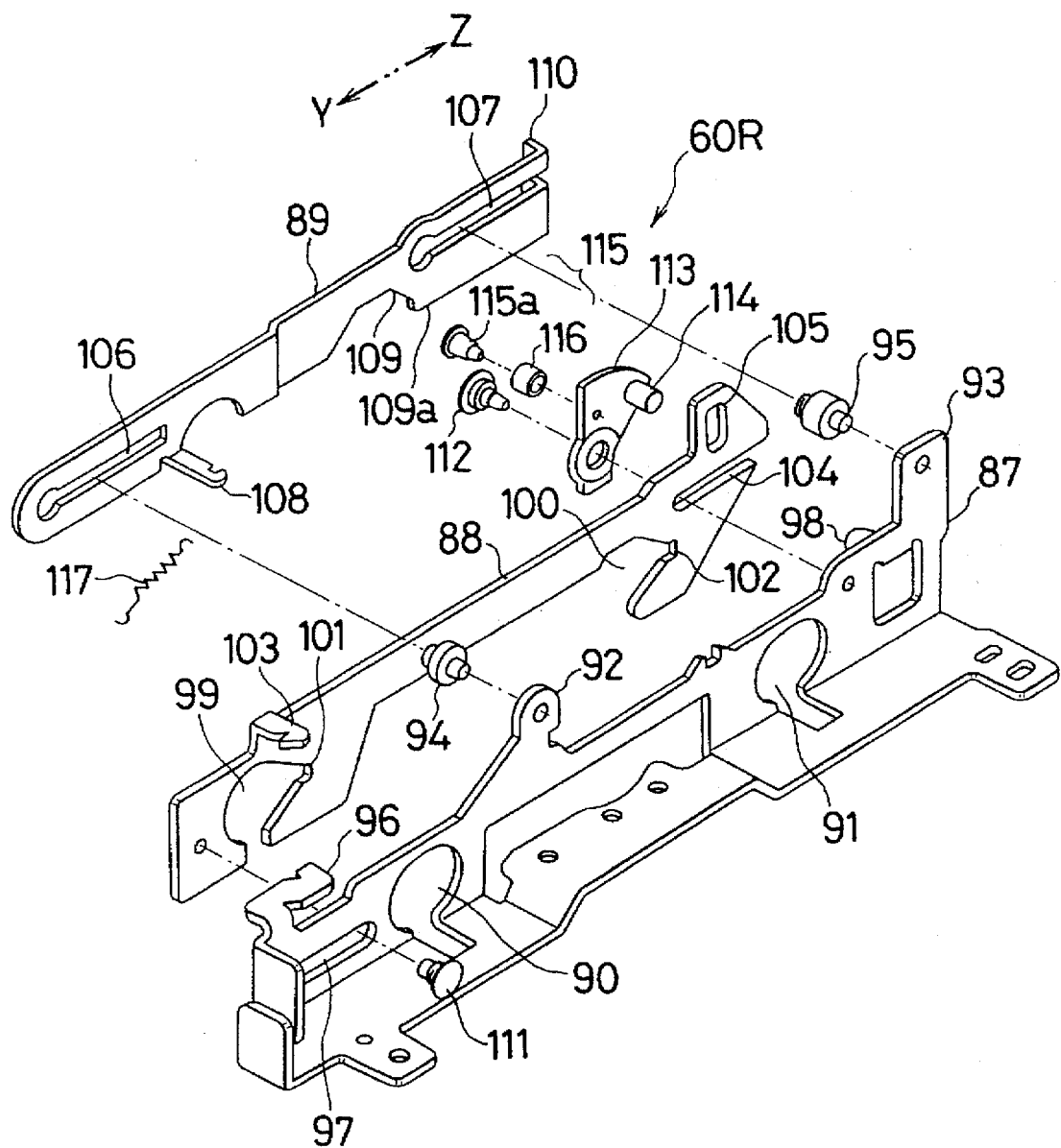
FIG. 23 is an exploded perspective view showing the right mechanical lock unit.
Figure 24:
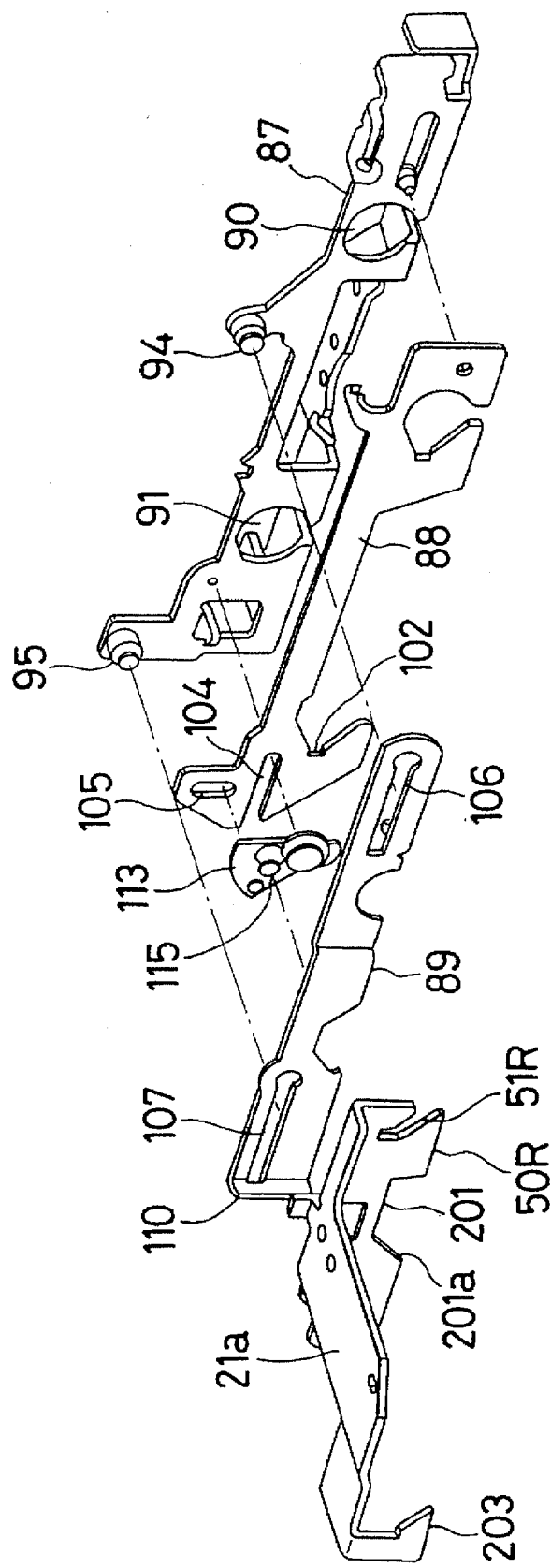
FIG. 24 is an exploded perspective view showing the right mechanical lock unit as viewed from the left.
Figure 25A:
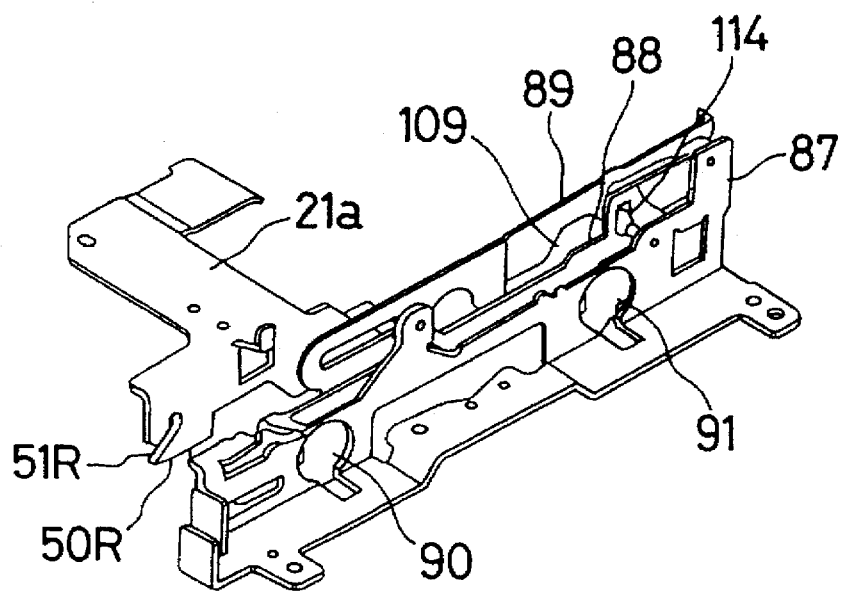
FIG. 25a is a perspective view showing the right mechanical lock unit in its lock state.
Figure 25B:
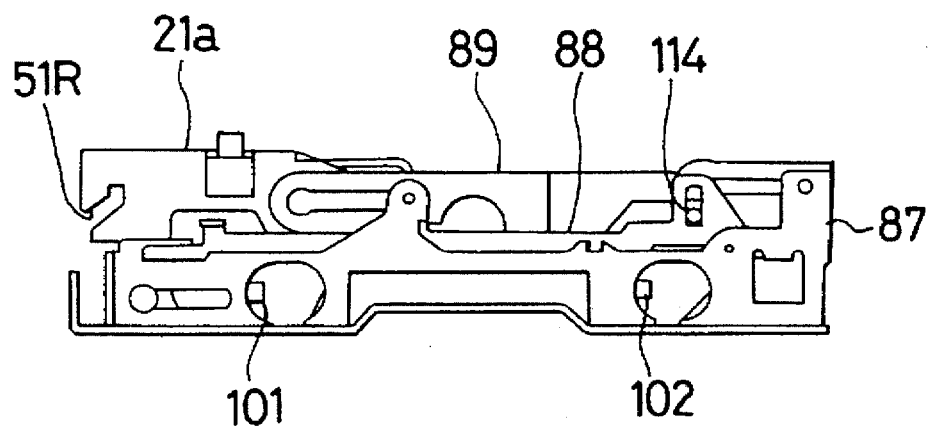
FIG. 25b is a side view showing the right mechanical lock unit in its lock state.
Figure 26A:
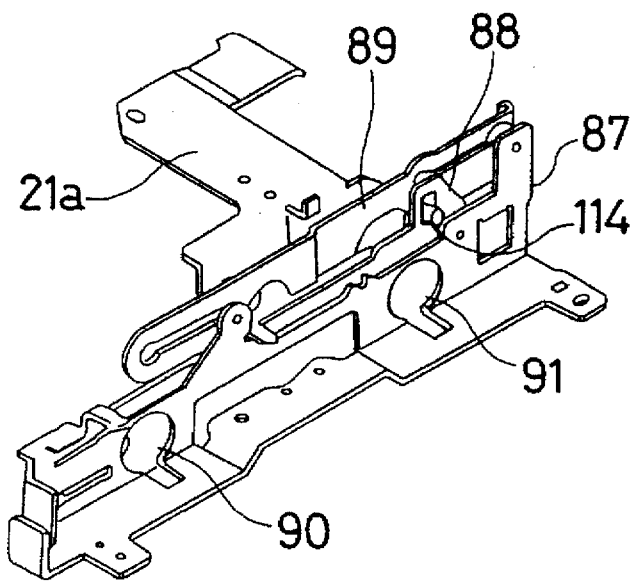
FIG. 26a is a perspective view showing the right mechanical lock unit in the initial phase of lock releasing.
Figure 26B:
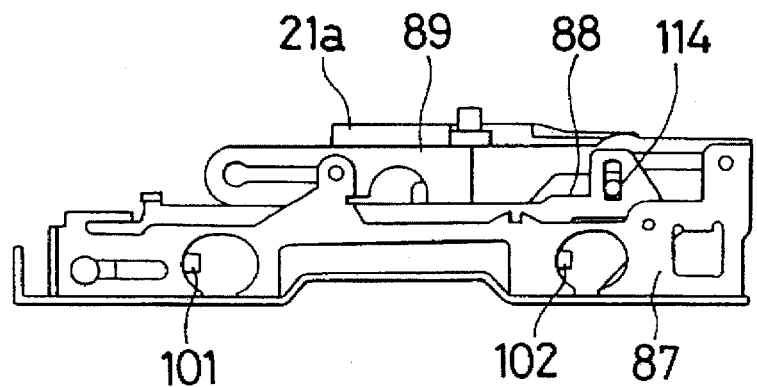
FIG. 26b is a side view showing the right mechanical lock unit in the initial phase of lock releasing.
Figure 27A:
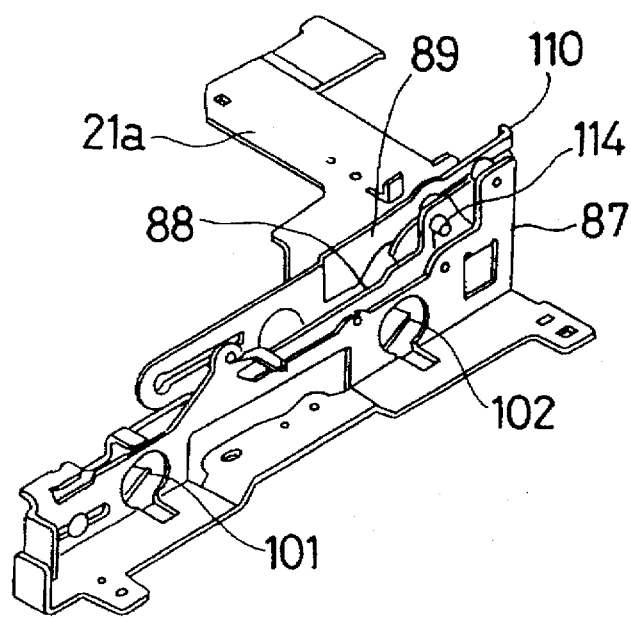
FIG. 27a is a perspective view showing the right mechanical lock unit in the middle of lock releasing.
Figure 27B:
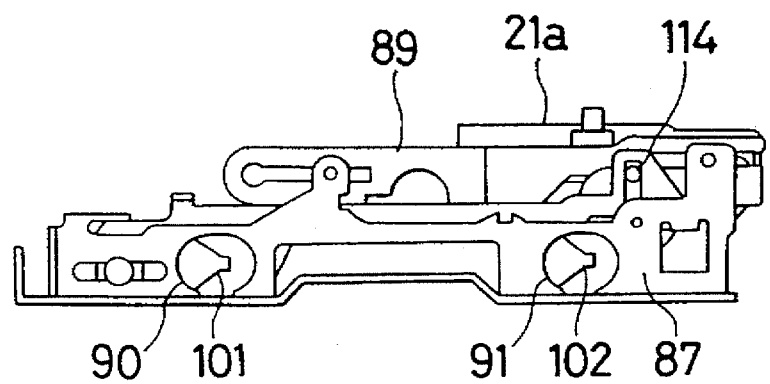
FIG. 27b is a side view showing the right mechanical lock unit in the middle of lock releasing.
Figure 28A:
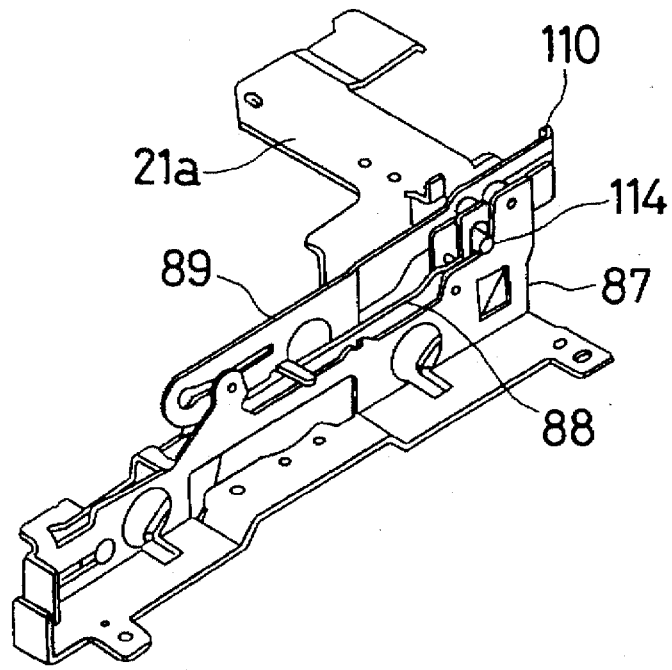
FIG. 28a is a perspective view showing the right mechanical lock unit in its lock released state.
Figure 28B:
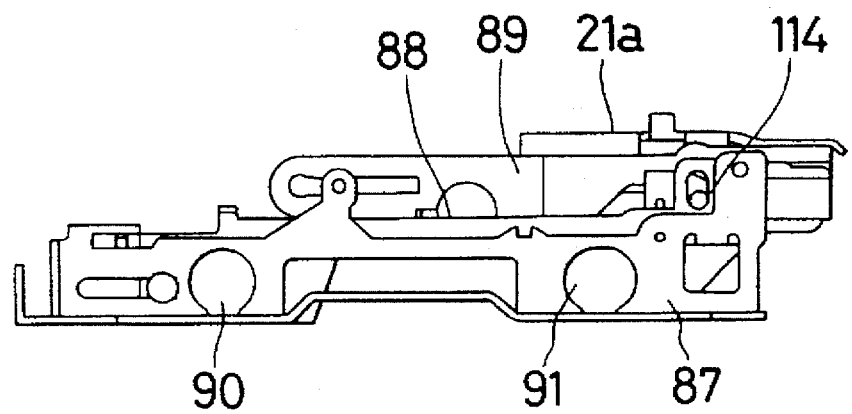
FIG. 28b is a side view showing the right mechanical lock unit in its lock released state.
Figure 29A:
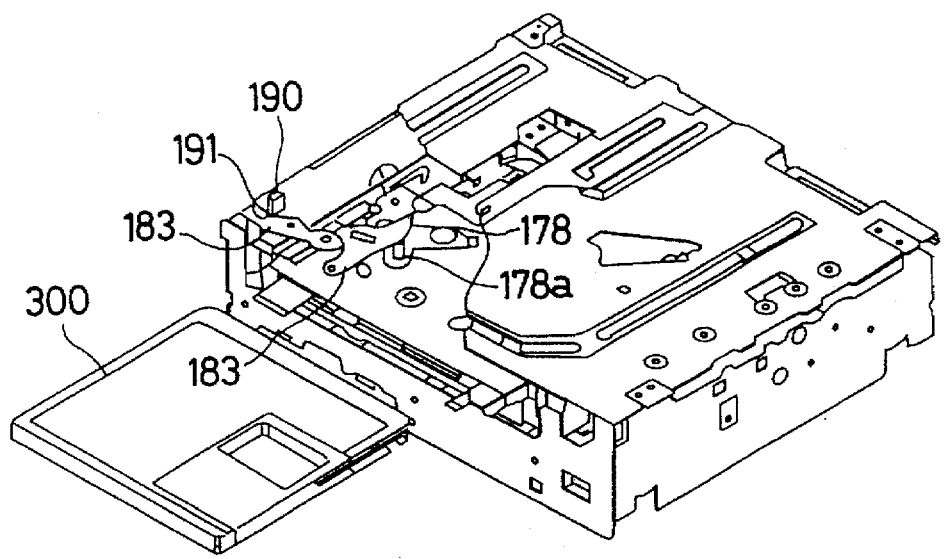
FIG. 29a is a perspective view showing the cartridge correct-insertion sensor mechanism.
Figure 29B:
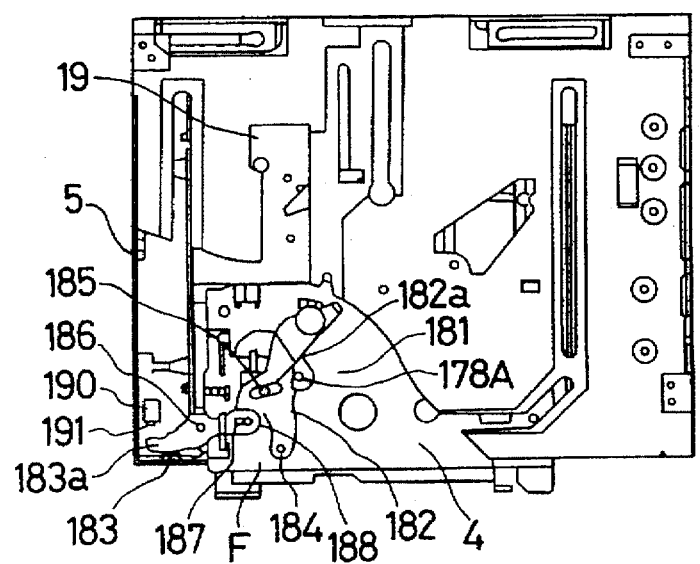
FIG. 29b is a plan view showing the cartridge correct-insertion sensor mechanism.
Figure 30A:
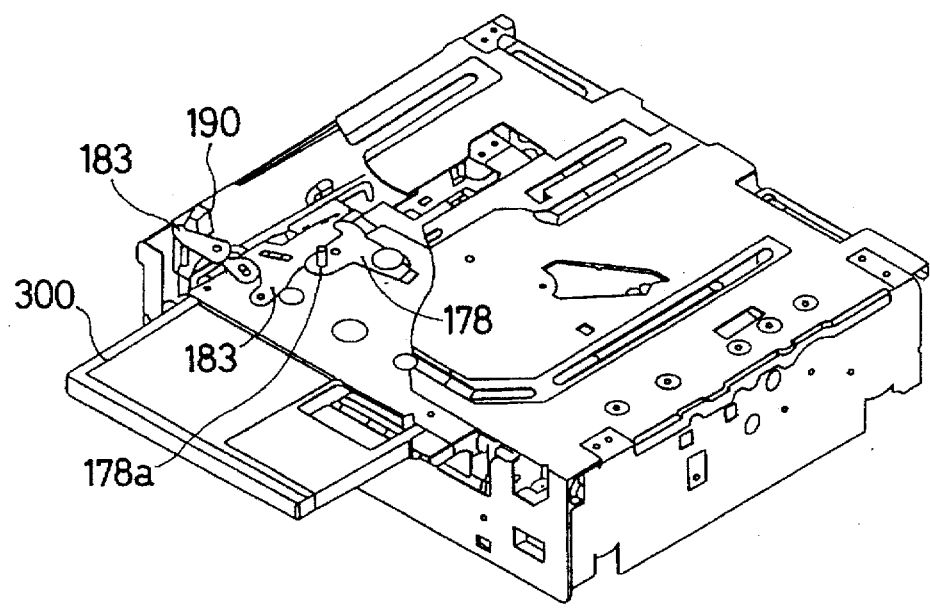
FIG. 30a is a perspective view showing the cartridge correct-insertion sensor mechanism in its active state.
Figure 30B:
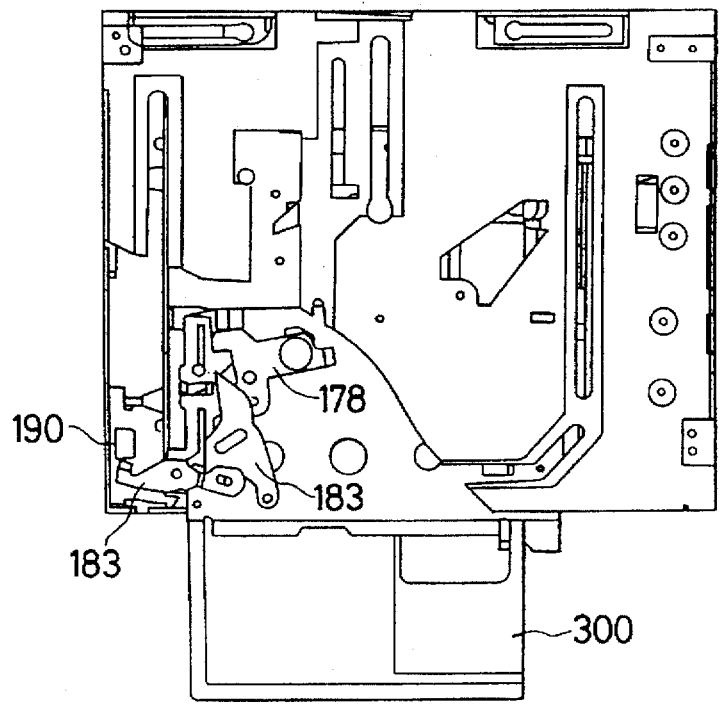
FIG. 30b is a plan view showing the cartridge correct-insertion sensor mechanism in its active state.

As shown in FIGS. 23 and 24, the right mechanical unit 60R comprises a lock guide 87, a lock plate 88, and a lock driving member 89. The lock guide 87 has on its front and rear portions substantially round openings 90, 91, and on its front portion a longitudinally extending guide slot 97. The lock guide 89 has also on the intermediate and rear end part of its top edge two guide shaft support portions. The lock guide 87 has also on its front and rear portions spring anchoring points 96, 98.

The lock plate 88 has on its front and rear portions cutouts 99, 100. The cutouts 99, 100 have on their respective rear edges V-shaped lock portions 101, 102. The lock plate 88 has on its top front edge a spring anchoring point 103, and on its rear portion a slit 104 and a vertically extending guide slot 105.

The lock driving member 89 has longitudinally extending slots 106, 107 in its front and rear portions, and a spring anchoring point 108 and a cam portion 109 formed of a cutout at its bottom edge. The lock driving member 89 has also at its rear end an abutment portion 110 projecting transversely inwardly.

The lock guide 87 is rigidly attached to the inside of the side chassis 6. A guide pin 111 attached to the front portion of the lock plate 88 is slidably engaged with the guide slot 97 of the lock guide 87. A guide shaft 112 attached to the rear portion of the lock guide 87 is slidably engaged with the slot 104. Thus, the lock plate 88 is longitudinally slidably movable with respect to the lock guide 87.

A lock cam 113 is pivotally supported by the guide shaft 112. A pin 114 and a lock cam shaft 115 are attached onto the lock cam 113. The lock cam shaft 115 is made up of a support shaft 115a and a cam follower 116. The pin 114 is slidably engaged with the guide slot 105 of the lock plate 88.

Guide shafts 94 and 95 respectively attached onto the middle and rear end parts of the top edge of the lock guide 87 are slidably engaged in the respective guide slots 106, 107 of the lock driving member 89. The lock cam shaft 115 of the lock cam 113 is slidably engaged in the cam portion 109 of the lock driving member 89. A spring 117 is disposed between the spring anchoring point 108 of the lock driving member 89 and the spring anchoring point 103 of the lock plate 88. The cam shaft 115 is engaged in the cam portion 201 of the second loader 21a.

Figure 7:
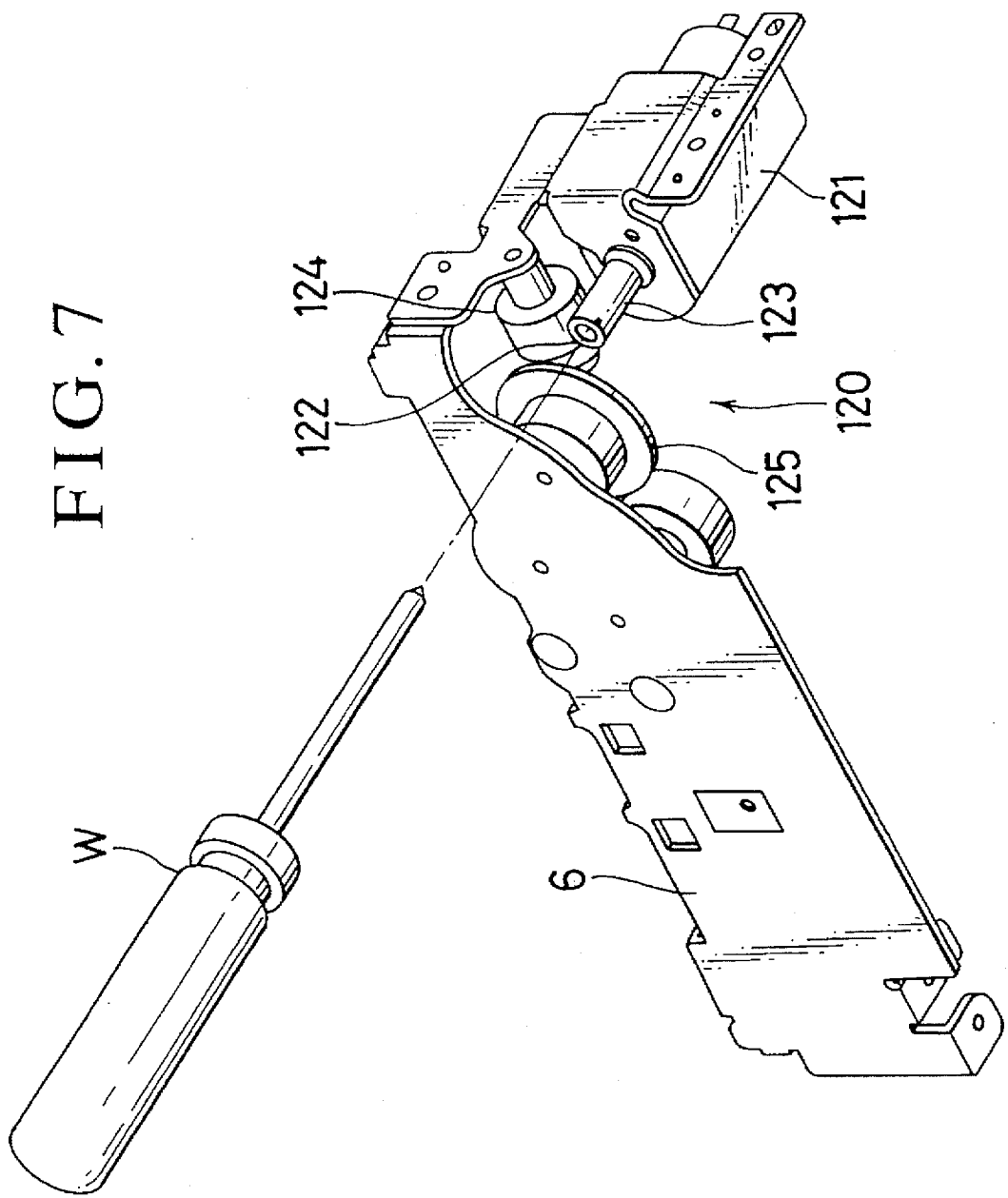
FIG. 7 is a perspective view showing the driving mechanism of the disk of the present invention with certain components omitted.
Figure 8:
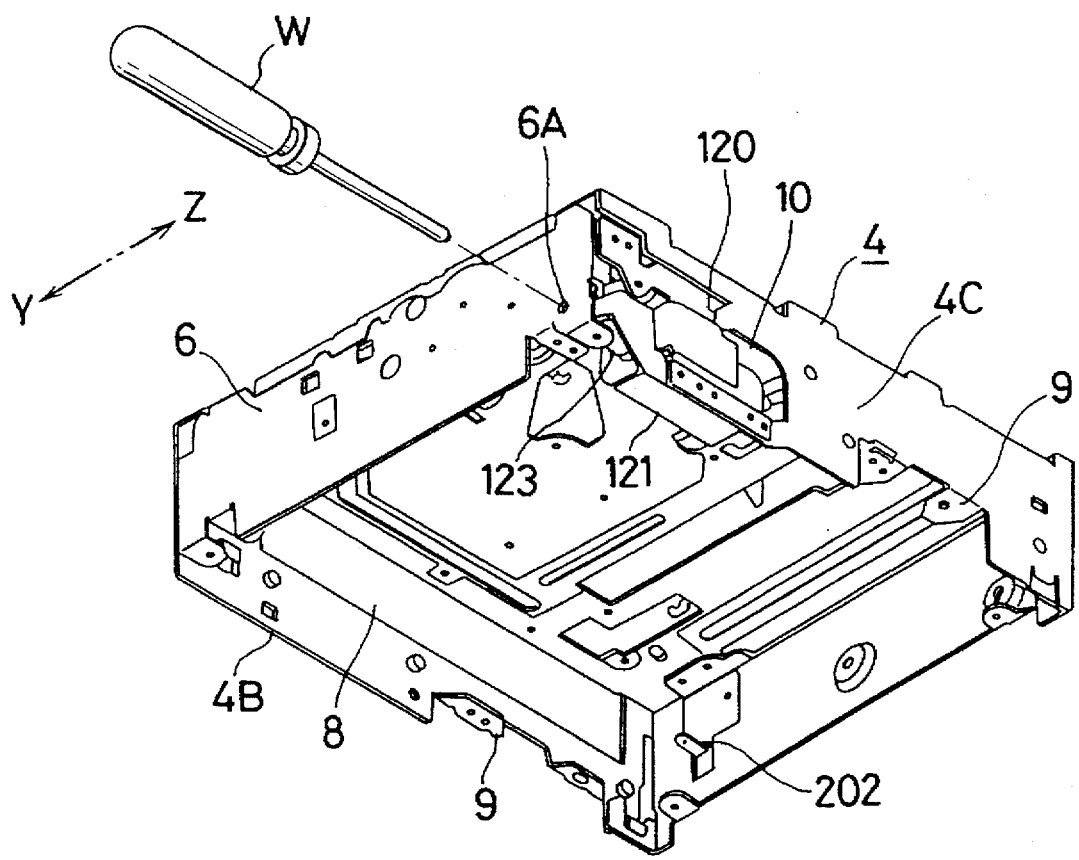
FIG. 8 is a perspective view showing the stationary chassis assembly equipped with the driving mechanism.
Figure 9:
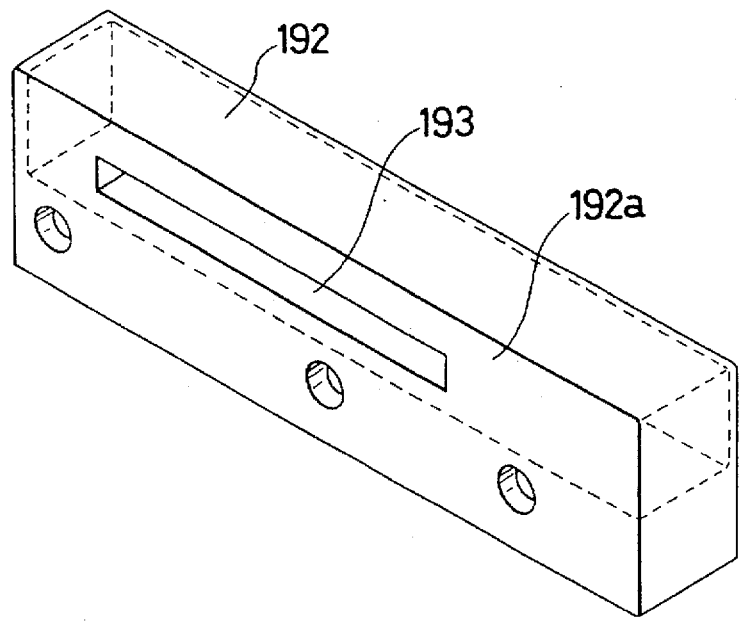
FIG. 9 is a perspective view showing the front cover.
Figure 10:
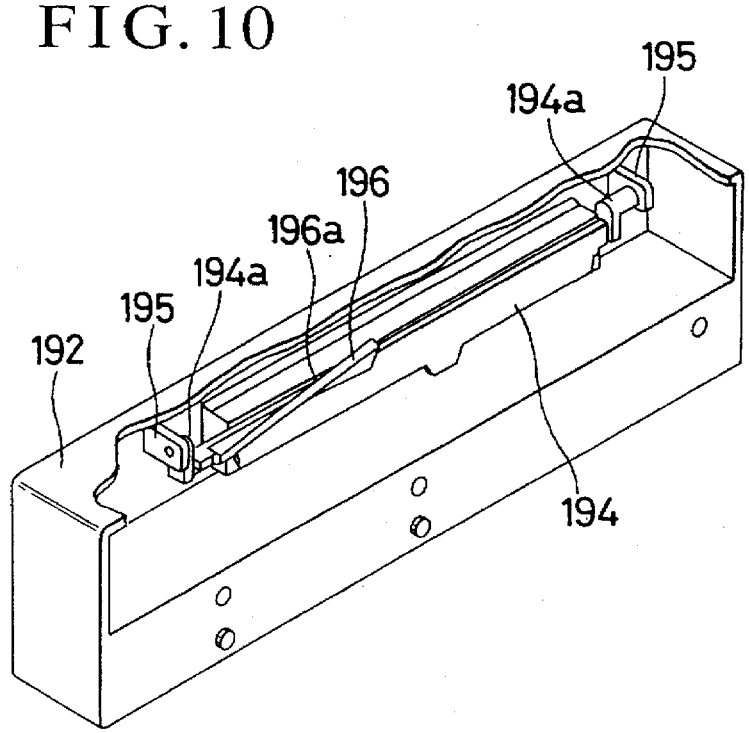
FIG. 10 is a perspective view showing the rear of the front cover with a dust cover mounted.
Figure 11A:
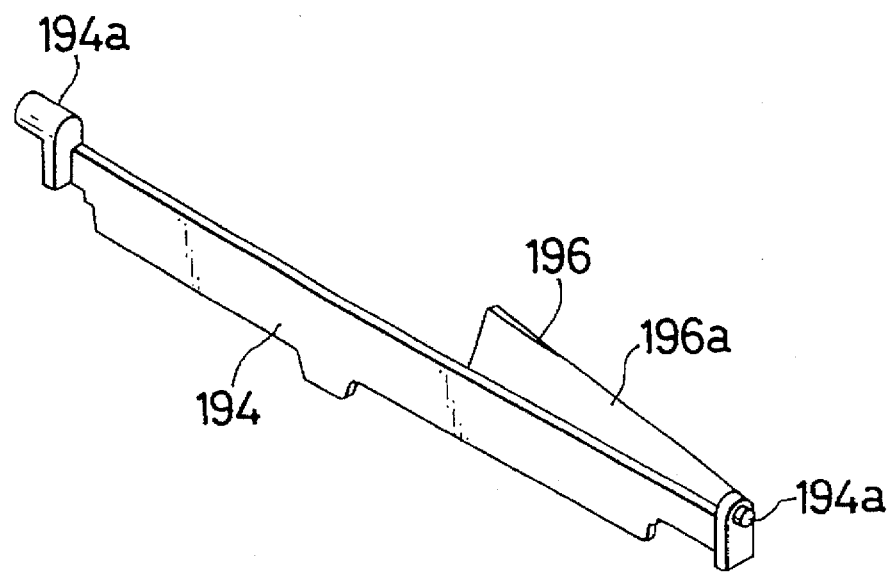
FIG. 11a is a perspective view showing the front of the dust cover.
Figure 11B:
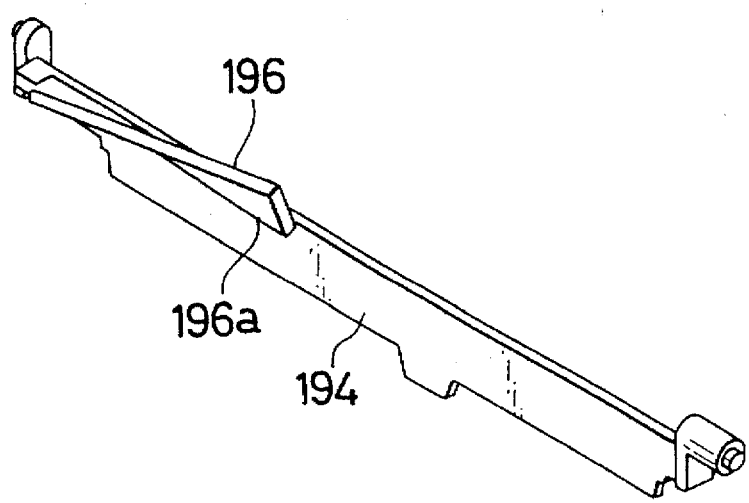
FIG. 11b is a perspective view showing the rear of the dust cover.
Figure 12A:
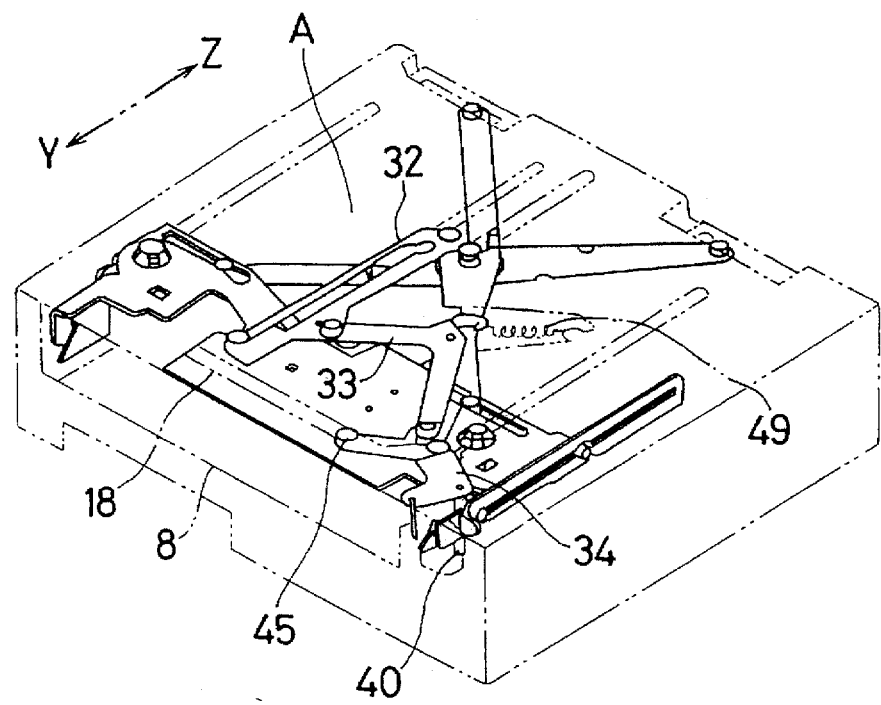
FIG. 12a is a perspective view showing the cartridge double-insertion preventing mechanism.
Figure 12B:
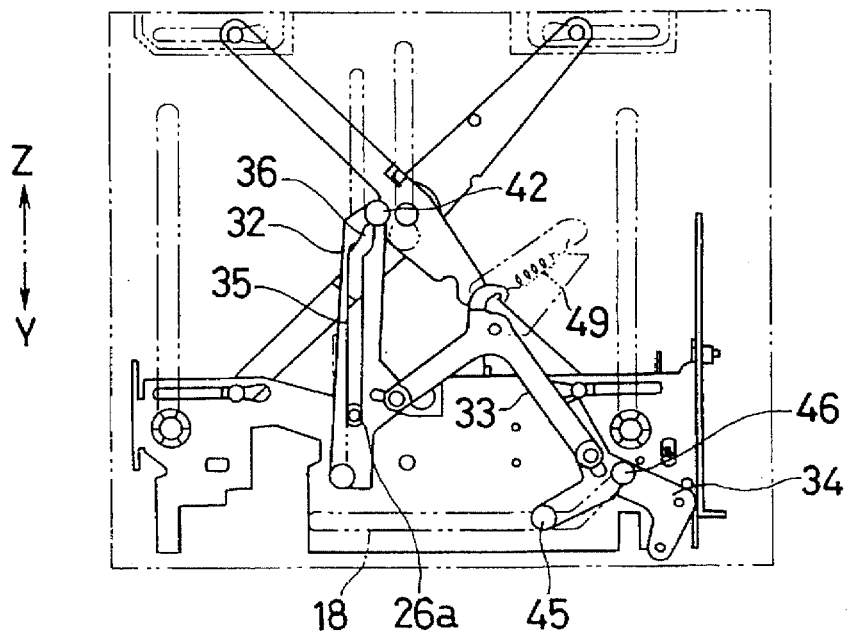
FIG. 12b is a plan view showing the cartridge double-insertion preventing mechanism.

Formed further inside the stationary chassis assembly 1 is a driving mechanism 120. As shown in FIGS. 7 and 8, the driving mechanism 120 comprises a driving motor 121 mounted onto a motor mount portion 10. A worm 123 is rigidly attached onto the output shaft of the driving motor 121. The worm 123 is coupled to a train of gears 125 via a worm wheel 124. The train of gears 125 is coupled to a pinion (not shown), and the pinion is meshed with the rack 53.

The end of the worm 123 is formed therein with a cross slot 122. An entry hole 6A, through which a driving tool W such as a screw driver is inserted, is formed in a surface part of the right side chassis 6 in the position corresponding to the cross slot 122 of the worm 123. In such an event of power interruption, the driving tool W may be inserted through the hole 6A, engaged with the cross slot 122 and turned to manually drive out the cartridge 300.

The stationary chassis assembly 1 is provided with a sensor switch driving block 181 of a cartridge correct-insertion sensor mechanism F as shown in FIGS. 3, 29a, 29b, and 30. The sensor switch driving block 181 comprises a sensor coupling lever 182 and a sensor switch lever 183. The sensor coupling lever 182 is pivotally connected by a fulcrum 184 at its front edge to the upper chassis 4. A guide pin 185 attached onto the upper chassis 4 is slidably engaged with an arc-shaped slot 182a formed in the sensor coupling lever 182. The rear portion of the sensor coupling lever 182 is projected into the opening 19. The sensor switch lever 183 is pivotally connected by its fulcrum 186 at the middle portion to the upper chassis 4. The sensor switch lever 183 has at its right end portion a transversely extending guide slot 187 with which a guide pin 188 attached onto the left side of the sensor coupling lever 182 is engaged. The sensor coupling lever 182 is counterclockwise urged by a spring (not shown). The urging of this spring causes a switch driving portion 183a at the left end of the sensor switch lever 183 to make lightly contact with the sensor element 191 of a sensor switch 190 that is rigidly attached onto the left side chassis 5.

The suspension chassis assembly 2 as the movable chassis assembly has four spring anchoring lugs 127, one for each of its four corners. Springs 128 as elastic members are disposed between these spring anchoring lugs 127 and the spring anchoring point 202 of the stationary chassis assembly 1 (and the spring anchoring point 203 on the left mechanical lock unit 60L, and the spring anchoring points 96, 98 on the right mechanical lock unit 60R). These springs 128 cause the suspension chassis assembly 2 to be suspended on the stationary chassis assembly 1. Dampers 129 are interposed between the suspension chassis assembly 2 and the stationary chassis assembly 1. The dampers 129 are mounted on the damper support brackets 9 on the stationary chassis assembly 1 and the right mechanical lock unit 60R.

Figure 31:
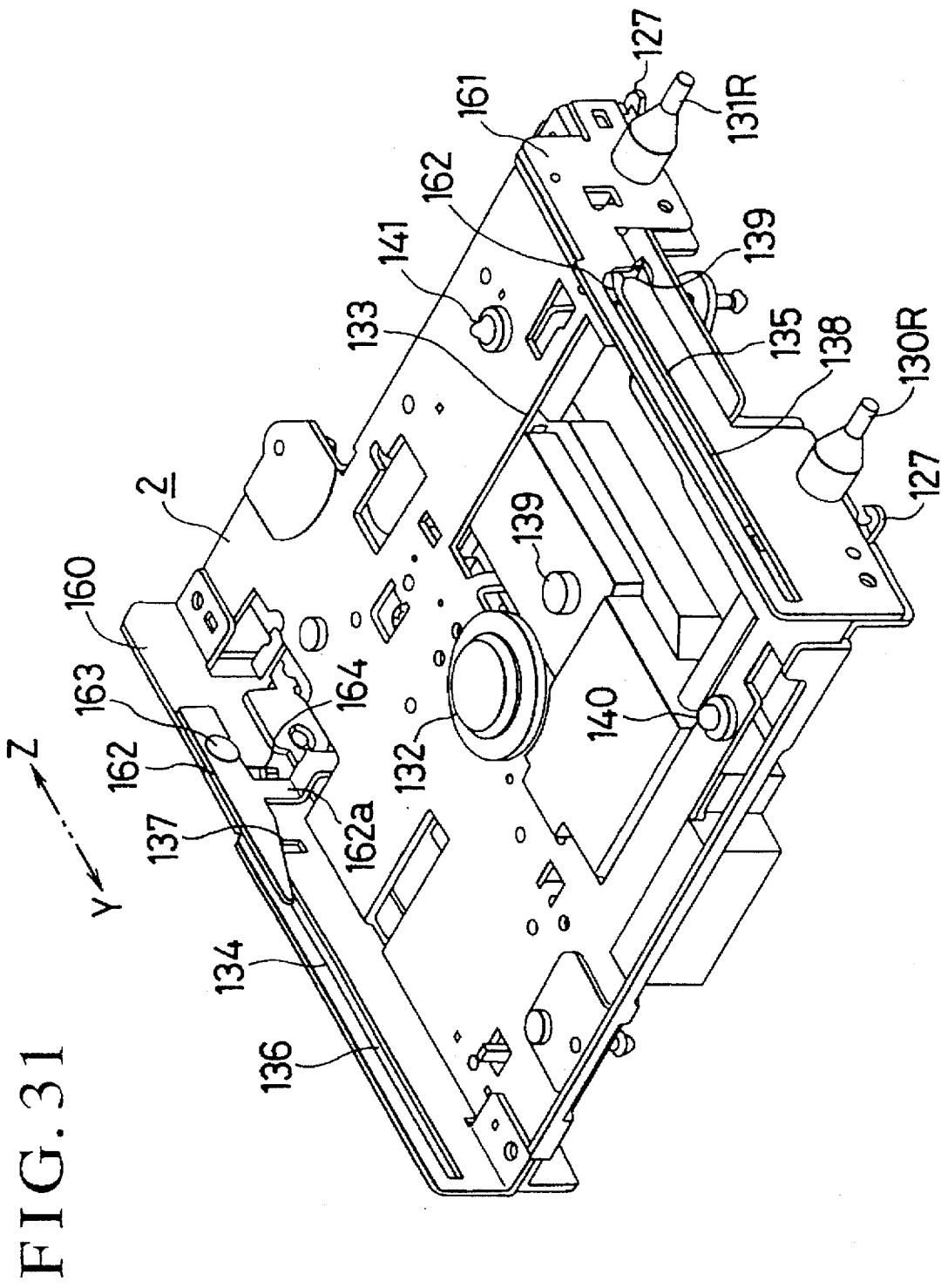
FIG. 31 is a perspective view showing the structure of the suspension chassis assembly.
Figure 32:
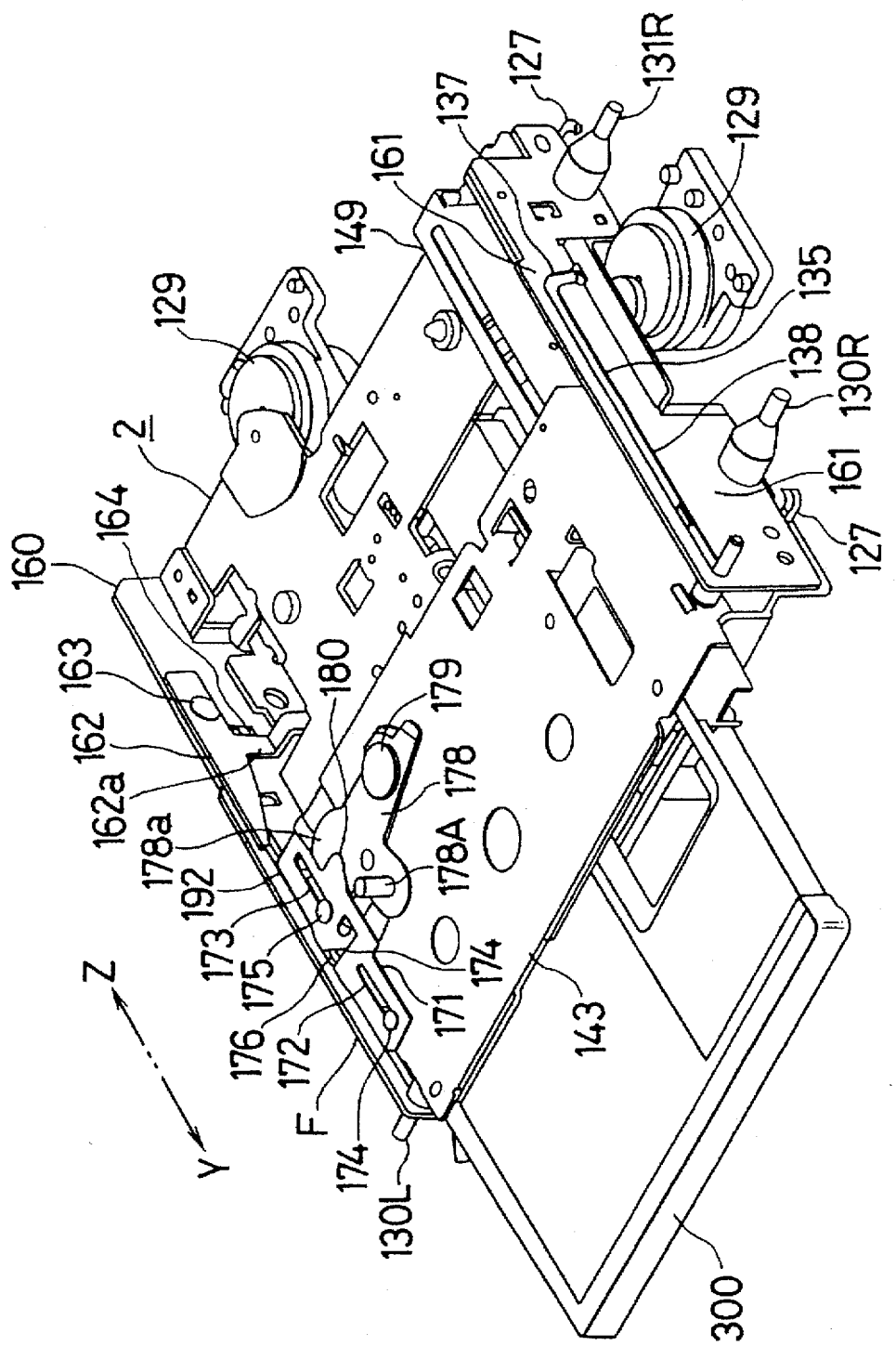
FIG. 32 is a perspective view showing the mechanical part of the suspension chassis assembly with the cartridge loaded therein.
Figure 33:
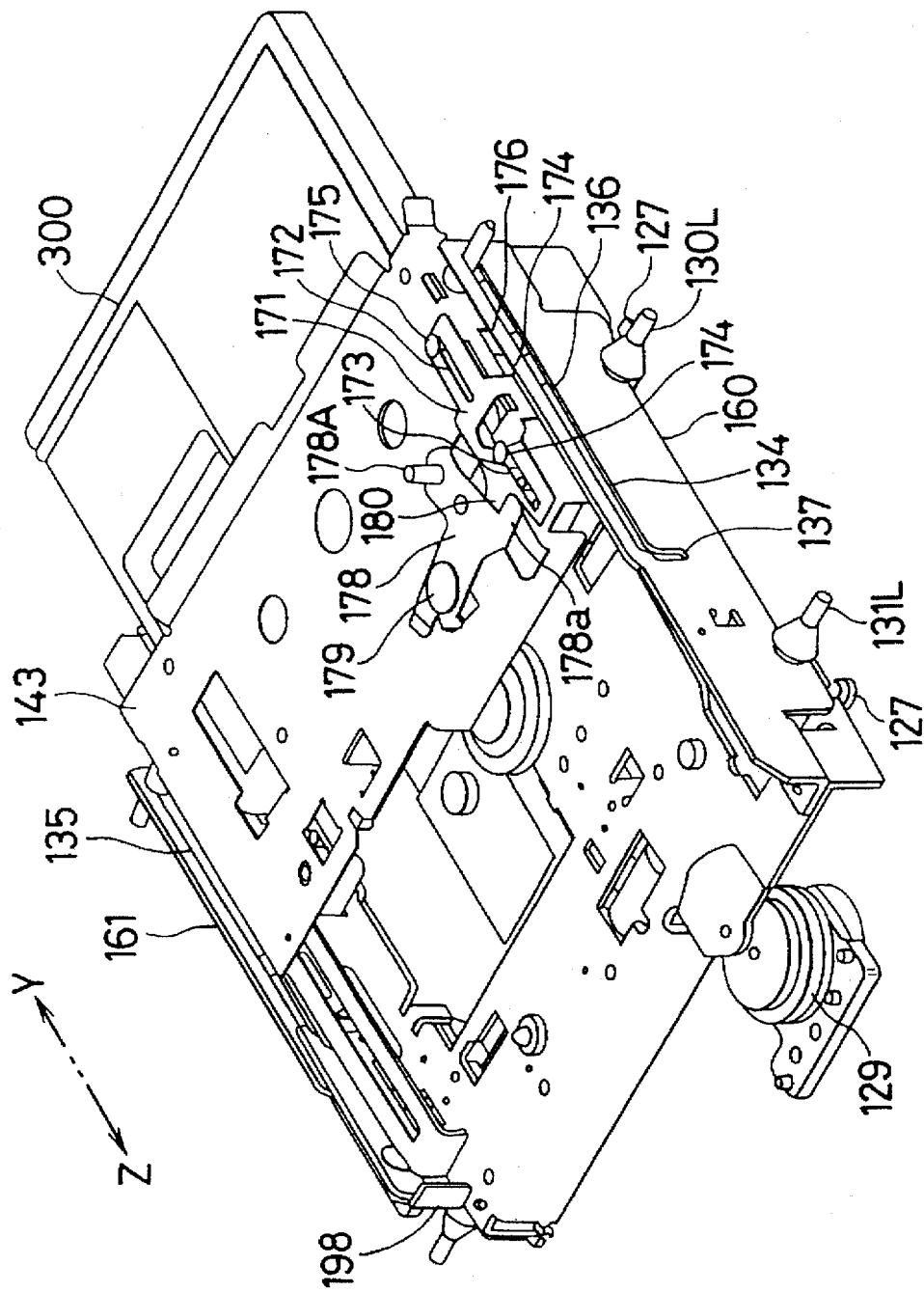
FIG. 33 is a perspective view showing the mechanical part of the suspension chassis assembly as viewed from behind.

Guide plates 160 and 161 are rigidly attached, respectively, on the right and left ends of the suspension chassis assembly 2 as shown in FIGS. 31 through 33. The guide plates 160 and 161 have on their front and rear sides lock pins 130R, 131R and 130L, 131L, respectively. The left front and rear lock pins 130L, 131L are inserted into the round openings 70, 71 of the lock guide 63 on the left mechanical lock unit 60L. The right front and rear lock pins 130L, 131L are inserted into the round openings 90, 91 of the lock guide 87 on the right mechanical lock unit 60R. This state is a lock-released state.

The suspension chassis assembly 2 has at its center a turntable 132 as shown in FIG. 31. The suspension chassis assembly 2 has also on the right side of the turntable 132 a cutout 133 within which a light pickup 139 is disposed. The light pickup 139 is displaced transversely (along the radius of the disk) by a screw shaft driving mechanism (not shown). A driving mechanism including a driving motor for driving the turntable 132 is mounted under the suspension chassis assembly 2.

The left and right guide plates 160, 161 of the suspension chassis assembly 2 have holder guide portions 134, 135, respectively as shown in FIG. 31. The left holder guide portion 134 is composed of a longitudinally extending linear guide slot 136 which is formed in the left guide plate 160, extending from the front to rear ends thereof, and a guide slot 137 that extends downward from the rear end part of the guide plate 160. The right holder guide portion 135 is composed of a longitudinally extending linear guide slot 138 which is formed in the right guide plate 161, extending from the front to rear parts of the front guide plate 161, and a guide slot 139 that extends downward from the rear end part of the guide plate 161. The suspension chassis assembly 2 is also provided with reference pins 140, 141 on the top surface part at the front and rear parts of its right side.

Disposed on the rear sides of the guide plates 160, 161 are fulcrums 163 about which holder press members 162 are pivoted. The holder press members 162 have downward projected stopper portions 162a. When the holder press members 162 are urged downward by springs (not shown), the projected stopper portions 162a abut stoppers 164 on the guide plates 160, 161 causing the holder press members 162 to remain in their horizontal position.

Figure 34:
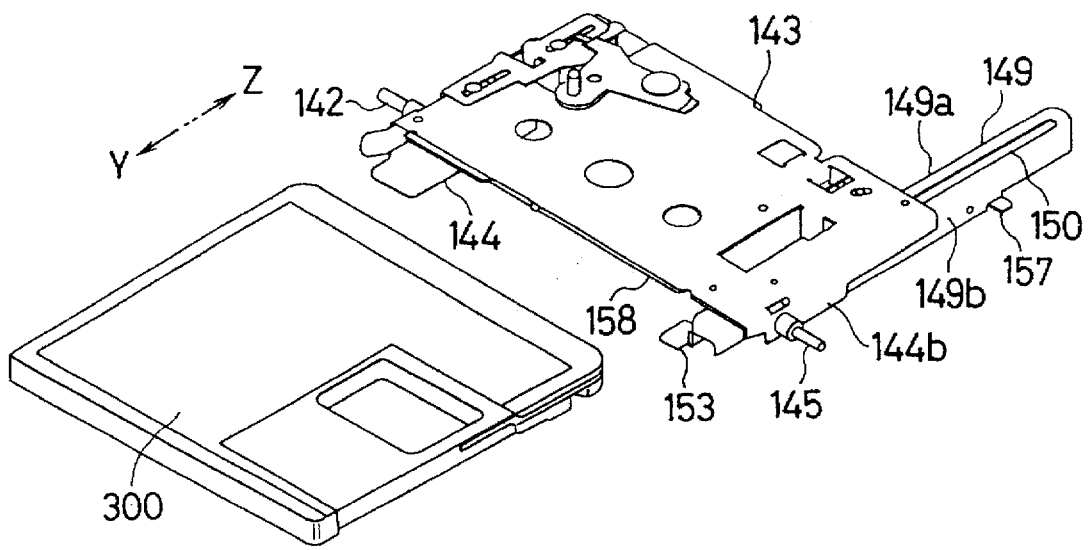
FIG. 34 is a perspective view showing a holder.
Figure 35:
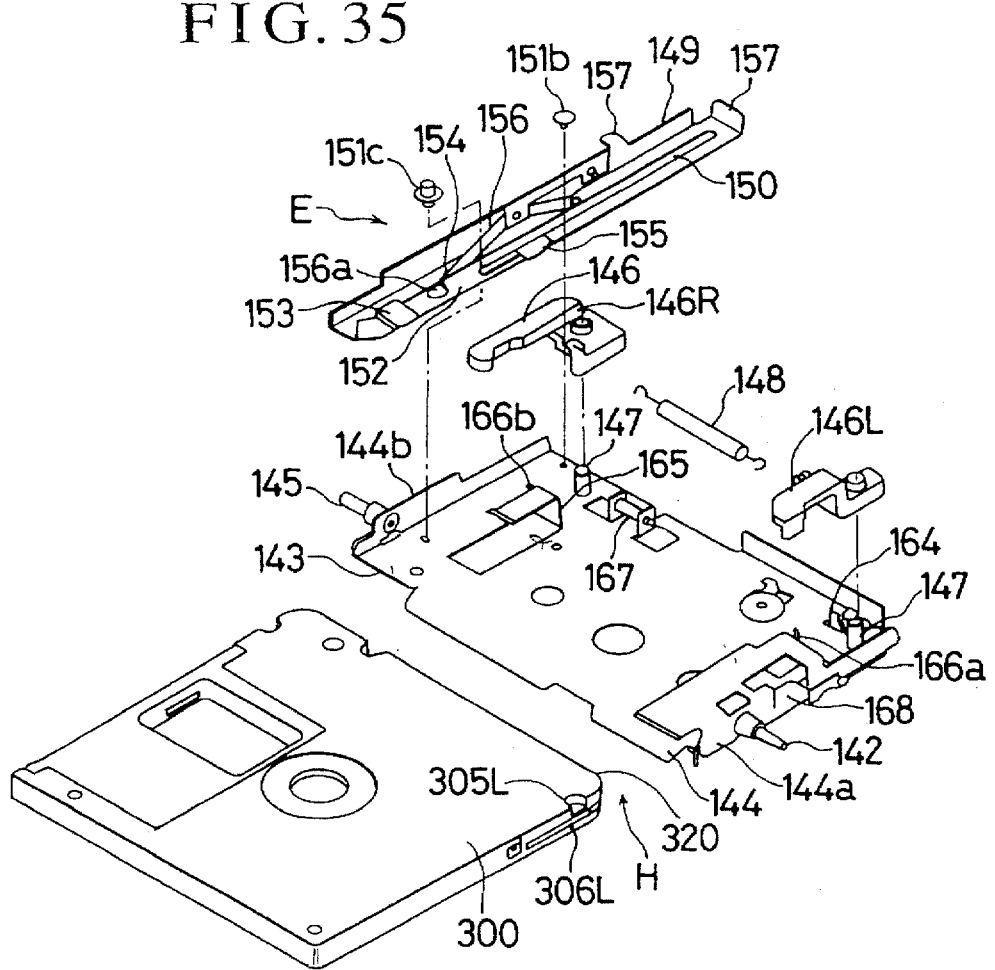
FIG. 35 is a perspective exploded view showing the holder viewed from below.

The suspension chassis assembly 2 has the holder 143 that is supported by the holder guide portions 134, 135 on the left and right guide plates 160, 161 in a manner that allows the holder 143 to be slidable longitudinally. As shown in FIGS. 34 and 35, a holding section 144 having a U-like cross-sectional shape is formed in the left side part of the holder 143. The holding section 144 has a left side surface portion 144a at the end face thereof. The holder 143 is bent at a right angle on its right side part so as to form a left side surface part 144b.

The left side surface portion 144a of the holder 143 is provided with a holder pin 142 at its front part. The right side surface portion 144b thereof is provided with a holder pin 145 at its front part.

The surface part of the holder 143 are formed therein with left and right cartridge receptacles 164, 165. As shown in FIG. 36, cartridge grips 146L, 146R are attached to the side of the holder 143 by pins 147 so as to be pivotable left and right. A spring 148 urges both cartridge grips 146L, 146R toward the center of the holder 143, namely toward each other. The left cartridge grip 146L remains in contact with a stopper portion 166a formed on the holding section 144. The right cartridge grip 146R remains in contact with a stopper portion 166b formed on the cartridge receptacle 165. Accordingly, both grips 146L, 146R are located at their neutral positions.

The cartridge grips 146L, 146R, made of synthetic resin, have, at their ends, locking protrusions 167 that are projected inward. The locking protrusions 167 are designed to be smaller than the cartridge grip notches 305 of the cartridge 300 as shown in FIGS. 37 and 38. When the cartridge grips 146L, 146R hold the cartridge 300 therebetween, the cartridge grips 146L, 146R are in contact with the stopper portions 166a, 166b without pressing the cartridge 300. Even though the locking protrusions 167 are engaged in the cartridge grip notches 305, a clearance K can be obtained therebetween.

Figure 40:
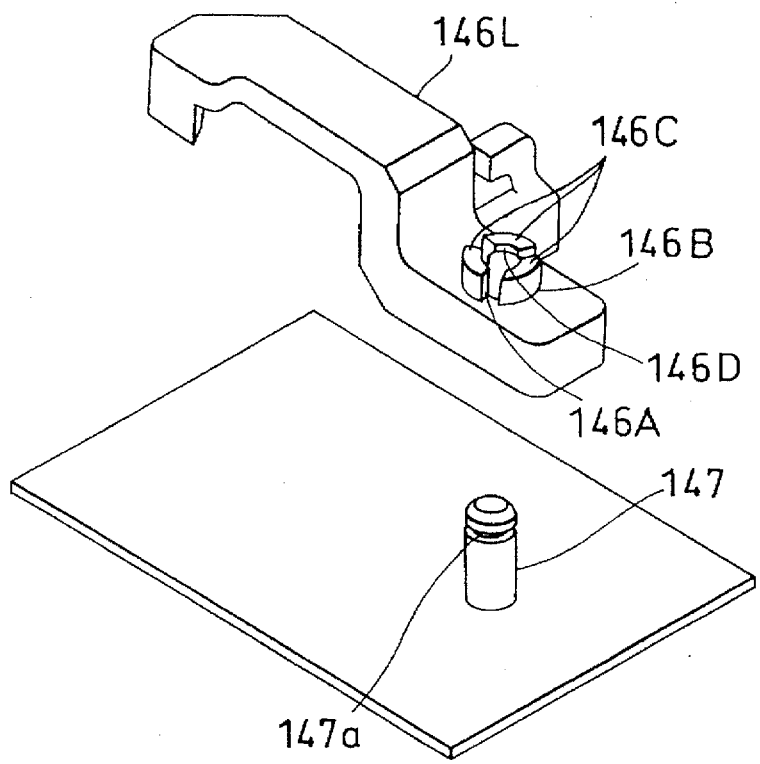
FIG. 40 is an exploded perspective view showing the support part of the cartridge grip.
Figure 41:
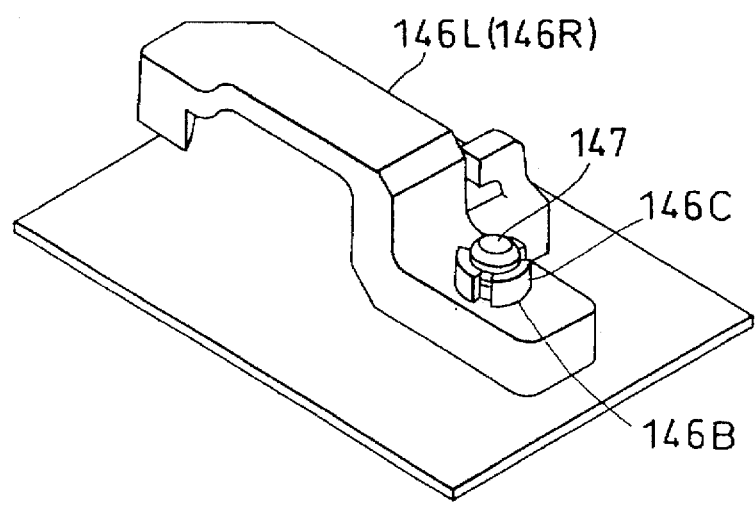
FIG. 41 is a perspective view showing the assembled cartridge grip.

The cartridge grips 146L, 146R are connected to the pins 147 through snap fitting. Namely, as shown in FIGS. 40 and 41, each of the pins 147 has near its end a circular groove 147a. A locking member 146B is formed around a through hole 146A that is drilled on the base portion of each of the cartridge gripes 146L, 146R. The locking member 146B is split into three segments 146C. Each segment 146C has at its one end an inwardly oriented locking projection 146D.

When the pins 147 are inserted through the holes 146A of the cartridge grips 146L, 146R, the ends of the pins 147 touch the projections 146D of the segments 146C, and accordingly they press the segments 146C which are therefore open radially outwardly. When the pins 147 are inserted further, the projections 146D are engaged with the circular grooves 147a, and then the segments 146C are then closed to complete the snap fitting.

Figure 42:
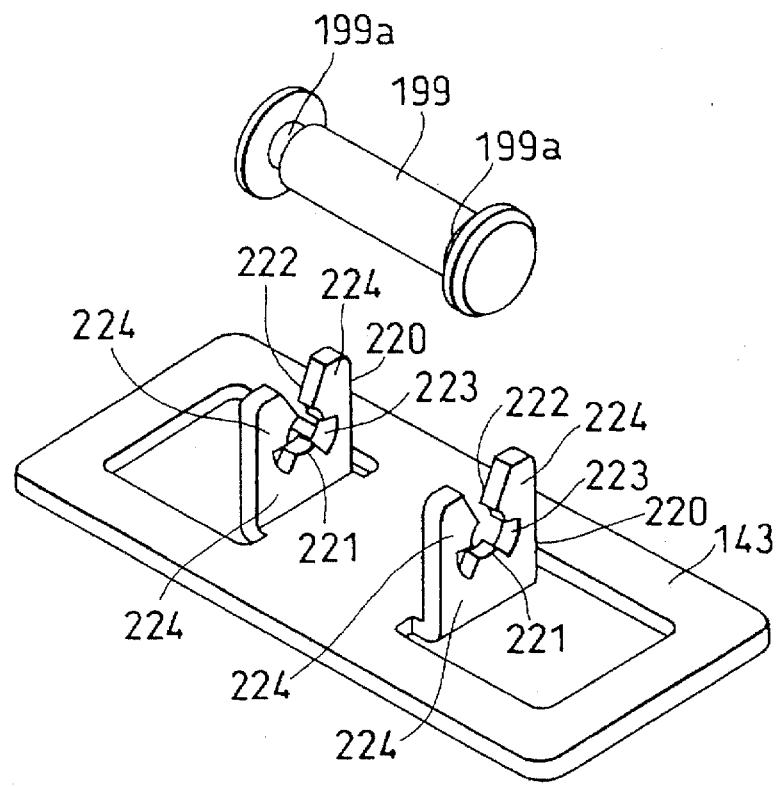
FIG. 42 is a perspective view showing the rear pin and its support structure.
Figure 43:
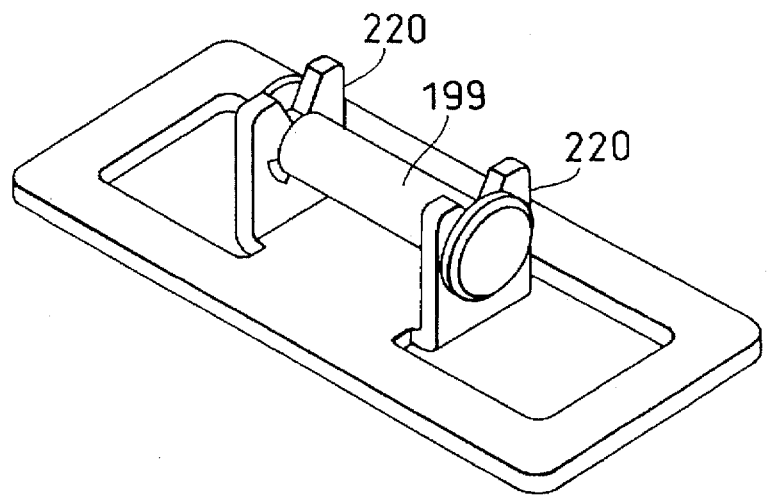
FIG. 43 is a perspective view showing the mounted rear pin.

A rear pin 199 is mounted on the left side of the rear surface part of the holder 143. As shown in FIGS. 42 and 43, the rear pin 199 is attached through snap-fitting. The rear pin 199 has near its both ends circular grooves 199a. The holder 143 is partially cut and bent to form two support brackets 220. Each support bracket 220 has a pin support socket 221 that is open via a cutout 222. The pin support socket 221 has a plurality of notches 223, and locking projections 224 are thus formed between notches 223.

When the rear pin 199 is inserted in the pin socket 221 pressed through the cutouts 222, the circular grooves 199a of the rear pin 199 make contact with the locking projections 224 which are therefore opened outward. Thus, the circular grooves 199a of the rear pin 199 are engaged with the pin support sockets 221 by snap fitting.

Figure 49:
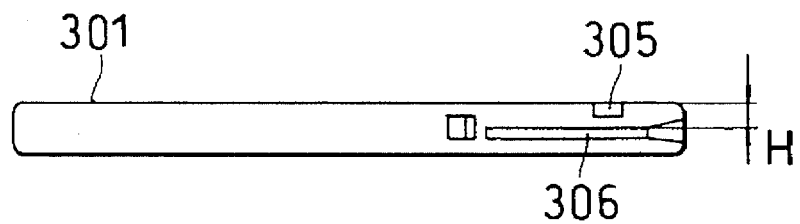
FIG. 49 is a view of the cartridge in the direction of the arrow I in FIG. 47.
Figure 50:
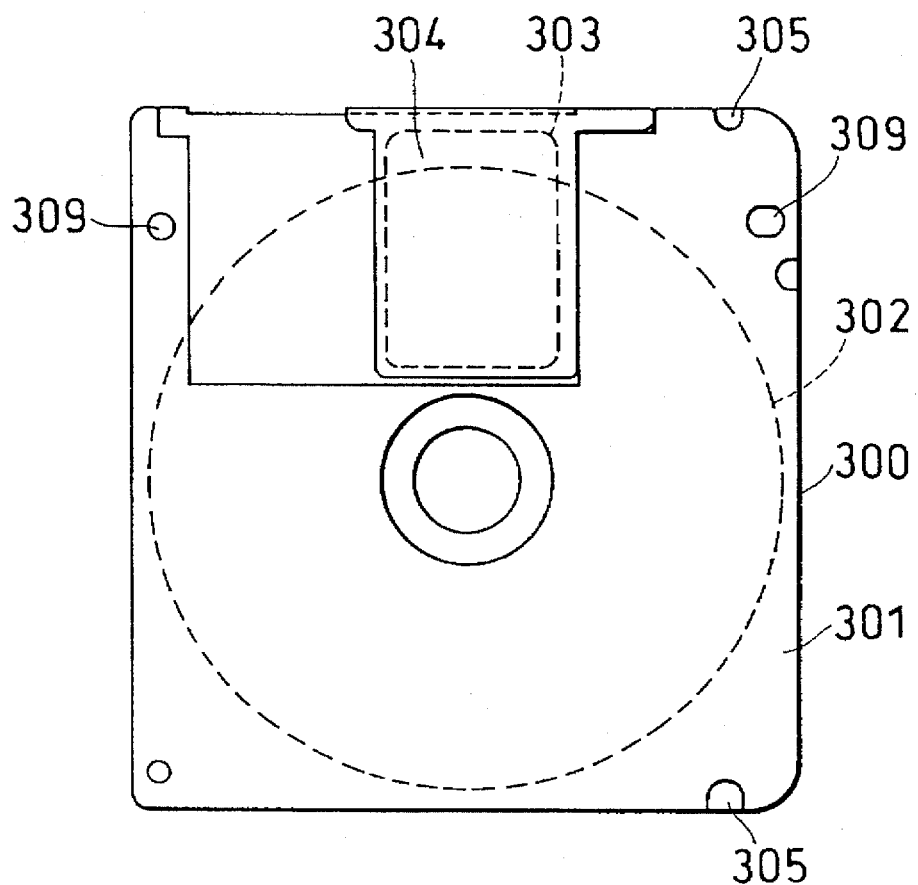
FIG. 50 is a plan view showing the cartridge as viewed from below.

The left side surface parts 144a of the holding section 144 of the holder 143 has a correct-insertion sensor blade 168 that is projected into the holding section 144. The height of the correct-insertion sensor blade 168 is set to be equal to a height H which is the height of the groove 306 that is formed extending from a round corner of the cartridge 300 to the side surface part as shown in FIGS. 35 and 49.

Figure 44A:
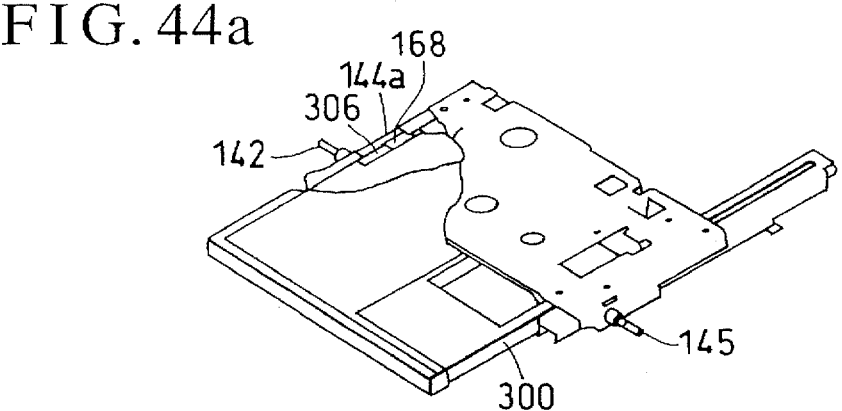
FIG. 44a is a perspective view showing the cartridge that is normally inserted in the cartridge insertion error preventing mechanism.
Figure 44B:
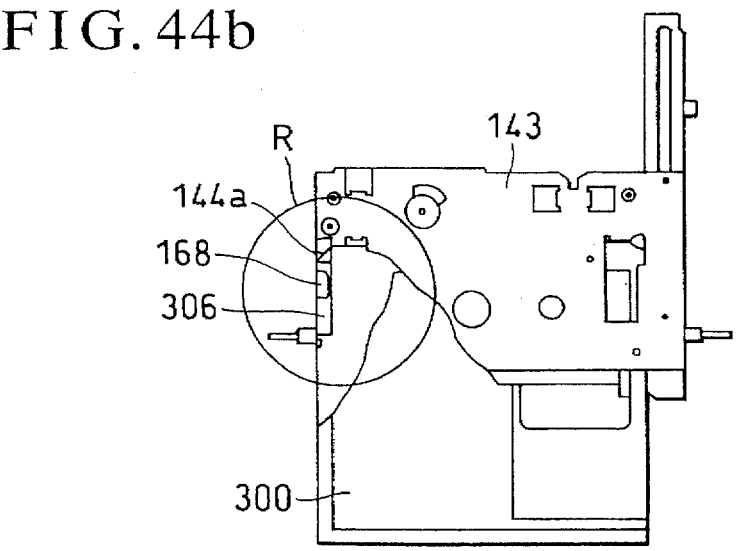
FIG. 44b is a plan view showing the cartridge that is normally inserted in the cartridge insertion error preventing mechanism.
Figure 44C:
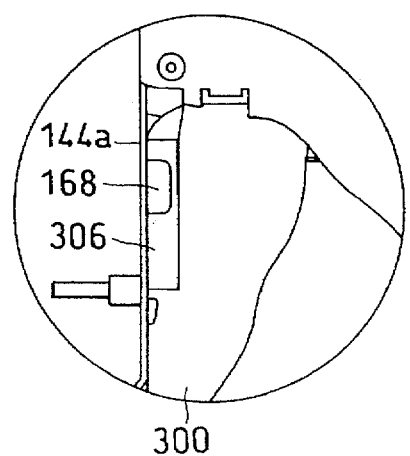
FIG. 44c is an enlarged view showing the R portion in FIG. 44b.
Figure 45A:
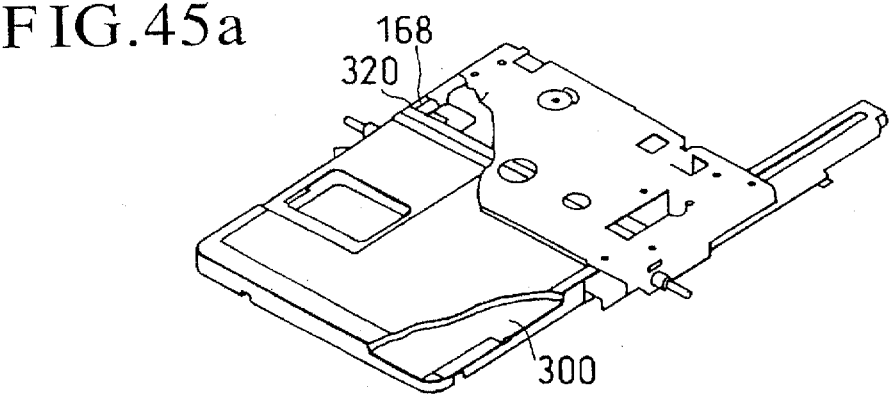
FIG. 45a is a perspective view showing the cartridge that is incorrectly inserted in the cartridge insertion error preventing mechanism.
Figure 45B:
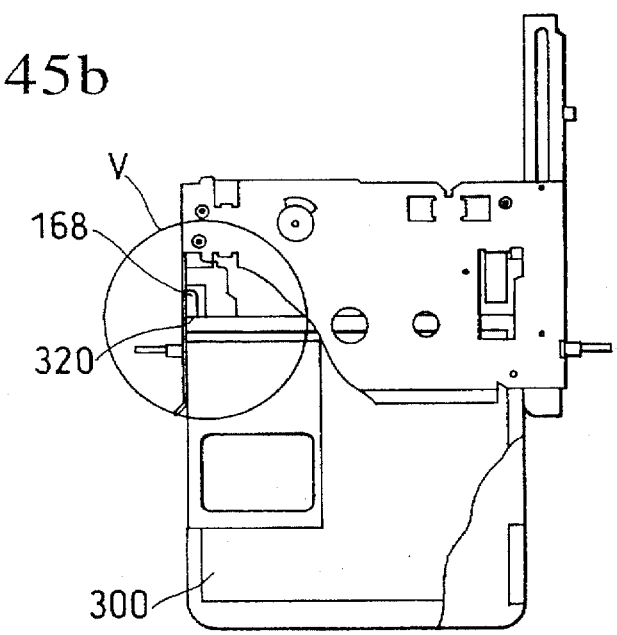
FIG. 45b is a plan view showing the cartridge that is incorrectly inserted in the cartridge insertion error preventing mechanism.
Figure 45C:
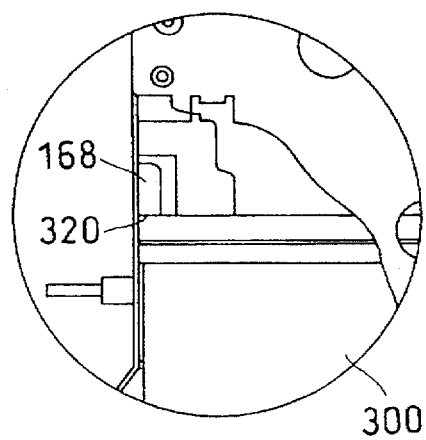
FIG. 45c is an enlarged view showing the V portion in FIG. 45b.

In the case of the normal insertion of the cartridge 300, the correct-insertion sensor blade 168 is inserted into the groove 306 as shown in FIG. 44. However, in the case of the incorrect insertion of the cartridge 300, the correct-insertion sensor blade 168 abuts against another round corner 320 of the cartridge 300 blocking the cartridge 300 from entering the disk apparatus as shown in FIG. 45.

The holder 143 has on its left side of the surface part a sensor block 192 of the cartridge correct-insertion sensor mechanism F. The sensor block 192 comprises a sensor plate 171 and a sensor lever 178 as shown in FIGS. 32 and 33. The sensor plate 171 has longitudinally extending slots 172, 173 in its front and rear portions, and further a cartridge sensing portion 174 and a lever abutment portion 180 projecting downward. The front and rear guide pins 174, 175 attached onto the surface part of the holder 143 on its left side are slidably engaged with the guide slots 172, 173 of the sensor plate 171. The sensor plate 171 is thus longitudinally slidable with respect to the holder 143. The cartridge sensing portion 174 is projected into the holding section 144 through a cutout 176 formed in the holder 143.

The sensor lever 178 is pivotally supported by a fulcrum 179 on the surface part of the holder 143. The sensor lever 178 at the underneath surface side of the holder 143 is counterclockwise urged by a spring 178b, and the left side part 178a of the sensor lever 178 abuts against the lever abutment portion 180 of the sensor plate 171. The sensor lever 178 has a lever shaft 178A that abuts against the sensor coupling lever 182 of the sensor switch driving block 181 of the cartridge correct-insertion sensor mechanism F located in the stationary chassis assembly 1.

A shutter opener 149 is supported on the right side part of the holder 143 so as to be longitudinal movable. The shutter opener 149 has a top surface part 149a that makes slidable contact with the right side part of the holder 143 and an outside surface part 149b as shown in FIGS. 34 and 35. The top surface part 149a has a longitudinally extending slide guide slot 150. The holder 143 has, at the front and rear pars of its right side part, a support pin 151a that also serves as a pin for releasing a shutter closure spring and another pin 151b. Both pins 151a, 151b, inserted through the slide guide slot 150, support the shutter opener 149.

The shutter opener 149 has, on the inside of the front part thereof, an inner surface part 152 and a horizontal surface part 153. The inner surface part 152 has an opening 154, and the front end parts of the inner surface part 152 and the horizontal surface part 153 are opened to the outside. A cartridge socket block 158 is constituted by the inner surface part 152 and the horizontal surface part 153 of the shutter opener 149 and the left side surface pat of the holding section 144 in the holder 143.

The shutter opener 149 has a shutter lock releasing pawl 155 on the inside of the intermediate part thereof. A shutter closure spring 156 is rigidly attached, on its intermediate part, to the inside of the outside surface part 149b of the shutter opener 149. The shutter closure spring 156 is bent inward, having its front end formed therein with a V-shaped locking portion 156a in a plan view. The locking portion 156a is projected through the opening 154 into the cartridge socket block 158. A stopper 157 extending outwardly is formed on the outside of the rear portion of the shutter opener 149. A stopper 198 provided on the guide plate 161 abuts against the stopper 157. The front support pin 151a constitutes a retraction mechanism E for retracting the locking portion 156b of the shutter closure spring 156 from the cartridge socket block 158 through the opening 154.

The left holder pin 142 of the holder 143 attached thereto with the shutter opener 149 is slidably engaged in the guide slot 136 of the left holder guide portion 134 of the suspension chassis assembly 2. The right holder pin 145 is slidably engaged in the guide slot 138 of the right holder guide portion 135 of the suspension chassis assembly 2. The holder 143 is thus supported by the suspension chassis assembly 2. The lever shaft 178A of the sensor block 192 of the cartridge correct-insertion sensor mechanism F is inserted into the opening 19 of the upper chassis of the stationary chassis assembly 1.

A front panel 192 is attached onto the front surface part of the stationary chassis assembly 1 as shown in FIGS. 1 and 2. The front panel 192 is of a box-like structure having its rear surface opened, and its front surface 192a formed therein with a cartridge front entry 193. A dust cover 194 is operably located in the front panel 192, behind the cartridge front entry 193.

Left and right brackets 195 are mounted underneath the front surface 192a, in the front panel 192. The dust cover 194 is pivotally supported at it opposite ends to fulcrums 194a to normally close the cartridge front entry 193 on the rear side thereof. A cam 196 is rigidly attached onto the right side of the dust cover 194. The cam 196 is produced by twisting a planar strip cam plate 196a by approximately 90°.

Prior to an insertion of a cartridge 300, the mechanical lock mechanism B locks the suspension chassis assembly 2 to the stationary chassis assembly 1.

Namely, when the lock plates 62, 88 of the left and right mechanical lock units 60L, 60R are located at their forward position, the lock pins 130L, 130R, 131L and 131R of the suspension chassis assembly 2 grips the lock portions 74, 75 and 101, 102 of the lock plates 62, 88 together with the peripheries of the openings 70, 71, 90, 91 of the lock guides 63, 87.

The operation of the disk apparatus thus constructed will now be discussed.

Figure 39A:
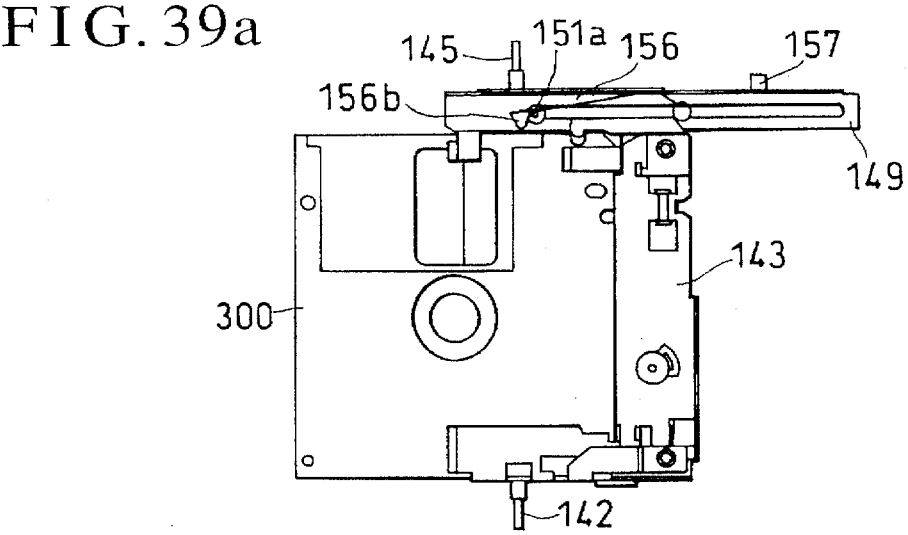
FIGS. 39a through 39c are explanatory views showing the operation of the shutter opener.

When the holder 143 is positioned at the cartridge entry opening 8 side as shown in FIG. 39a, the support pin 151a of the holder 143 is also positioned forward. The shutter closure spring 156 abuts inwardly with the pin 151a, and the locking portion 156b at the end of the shutter closure spring 156 is retracted from the opening 154.

Figure 39B:
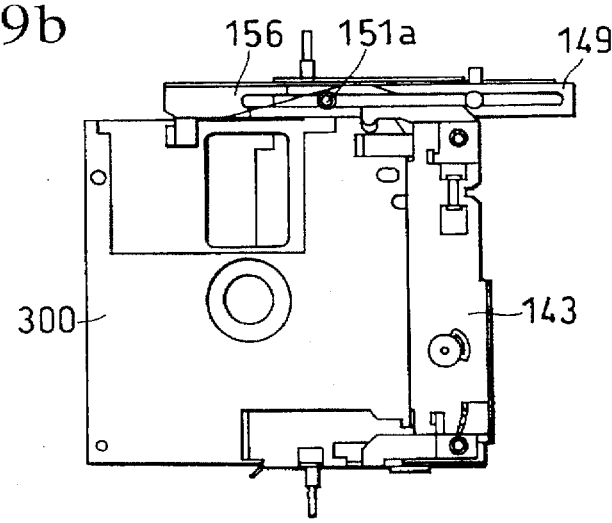

The cartridge 300 is inserted through the cartridge front entry 193 of the front panel 192, pushing the dust cover 194 open. The cartridge 300 is then inserted through the cartridge entry opening 8 into the cartridge socket block 158. When the forward end of the cartridge 300 reaches the cartridge socket 163 of the holder 143, the shutter lock releasing pawl 155 of the shutter opener 149 is inserted into the groove 306 of the cartridge 300. The left and right cartridge grips 146L, 146R of the holder 143 are engaged with the left and right cartridge notches 305. The cartridge 300 is thus held by the holder 143 via the cartridge grips 146L, 146R (see FIG. 39b).

By pushing the cartridge 300 further, the control circuit (not shown) of the driving motor 121 of the driving mechanism 120 is switched on. The driving mechanism 120 activates the loader G, causing the slide shutter of the cartridge 300 to open, the suspension chassis assembly 2 to be released from locking and the cartridge 300 to be automatically loaded.

Operation of the correct-insertion sensor mechanism F

The holding section 144 of the holder 143 is provided with the correct-insertion sensor blade 168. The height of the correct-insertion sensor blade 168 is set to be a value H which is equal to the height f the groove 306 of the cartridge 300. Even through the cartridge 300 is inserted upside down as shown in FIG. 45, the correct-insertion sensor blade 168 abuts against the edge of the cartridge 300, preventing the cartridge 300 from being incorrectly inserted. When the cartridge 300 is incorrectly inserted, the round corner 320 of the cartridge 300 touches the cartridge sensing portion 174 of the sensor plate 171, causing the sensor plate 171 to move rearward. This causes the sensor lever 178 to pivot against the spring. As a result, the lever shaft 178A on the sensor lever 178 causes the sensor coupling lever 182 of the sensor switch driving block 181 in the stationary chassis assembly 1 to pivot against the urging of the spring 189. The sensor switch lever 183 is actuated, the sensor switch 190 is turned on, and the insertion of the cartridge is thus recognized (refer to FIGS. 29a, 29b, 30a and 30b).

Operation of the loader G

Rotation of the driving motor 121 is transmitted, via the worm gear 123, the worm wheel 124 and the train of gears, to the pinion with which the loader G is meshed on the rack portion 52. The loader G thus moves rearward.

Opening operation of the slide shutter 304 in the cartridge 300

The holder pin 142 is slidably engaged with the left-hand holder locking portion 50L of the loader G. The holder pin 145 is slidably engaged with the right-hand holder locking portion 50R of the loader G. The rearward motion of the loader G moves the holder 143 rearward, causing the cartridge 300 to move rearward as well.

Figure 39C:
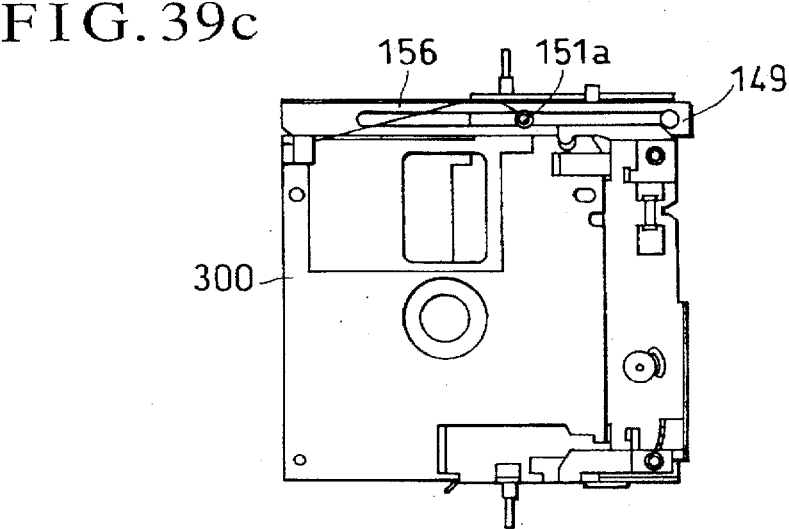

As the holder 143 moves rearward, the support pin 151a clears of the shutter closure spring 156. The locking portion 156b at the end of the shutter closure spring 156 is thus projected into the cartridge socket block 158 through the opening 154. In the course of this action, the stopper 198 located on the suspension chassis assembly 2 touches the rear projection 157 of the shutter opener 149, blocking the shutter opener 149 from moving rearward (refer to FIG. 39c).

The shutter lock releasing pawl 155 of the shutter opener 149 pushes the shutter locking member of the cartridge 300, so as to retract the same, and accordingly, the stopper 307 of the slide shutter 304 is disengaged from the shutter locking member. In the meantime, the locking portion 156b at the end of the shutter closure spring 156 is engaged with the shutter control hole of the slide shutter 304. As the cartridge 300 moves rearward, the slide shutter 304 is thus opened (Reference is made to FIGS. 34 and 35).

Lock releasing operation of the suspension chassis assembly 2

As the loader G moves rearward, the left lock release portion 211 of the loader G touches the abutment portion 69 of the lock driving member 61 in the left mechanical unit 60L, causing the lock driving member 61 to move rearward against the urging of the spring 86. As shown in FIGS. 18 and 19, the lock cam shaft 81 of the lock cam 78 comes out of engagement with the notch 67 of the lock driving member 61 and stays within the cutout 66. The urging of the spring 86 pulls the lock plate 62 rearward, disengaging the lock portions 74, 75 from the left lock pins 130L, 131L of the suspension chassis assembly 2.

At the same time, the right lock release portion 200 of the loader G touches the abutment portion 110 of the lock driving member 89 in the right mechanical unit 60R, causing the lock driving member 89 to move rearward against the spring 117. The lock cam shaft 115 of the lock cam 113 is disengaged from the cam edge 109a of the cam portion 109 of the lock driving member 89, and is then positioned within the cam portion 109. The urging of the spring 177 pulls the lock plate 88 rearward, disengaging the lock portions 101, 102 from the right lock pins 130R, 131R in the suspension chassis assembly 2. This disengages locking of the suspension chassis assembly 2 (Reference is made to FIGS. 25a, 25b, 26b, 27a, 27b, 28a and 28b). The suspension chassis assembly 2 is now supported by four springs 128 at its four corners.

Automatic loading operation of the cartridge 300

As the holder 143 moves rearward, the holder pins 142, 145 are guided along the left and right holder guide portions 134,135 and then to the downward extending slots 137 and 139 of the holder guide portions 134, 135. The holder pins 142, 145 reach the downward extending slots 137, 139 while keeping the holder press members 162 raised against the springs. Once the holder pins 142, 145 are guided into the slots 137, 139, the urging of the springs returns the holder press members 162 back to their original positions. With the holder pins 142, 145 in the downward extending slots 137, 139, the hub of the turntable 132 is engaged with the center of the opening in the underneath surface of the cartridge 300. The reference pins 140 and 141 are inserted into the pin support hole 309. The holder pins 142, 145 remains engaged with the notches 51L, 51R of the holder pin locking portions 50L, 50R.

When the control circuit (not shown) for the driving motor 121 of the turntable 132 is switched on under the above conditions, power is supplied to the control circuit (not show) in the driving motor of the light pickup. The data storage disk 302 is rotated. The screw shaft driving mechanism moves the light pickup transversely (along the radius of the disk) to perform recording or reproducing.

Operation of the cartridge double-insertion preventing mechanism A

Figure 13A:
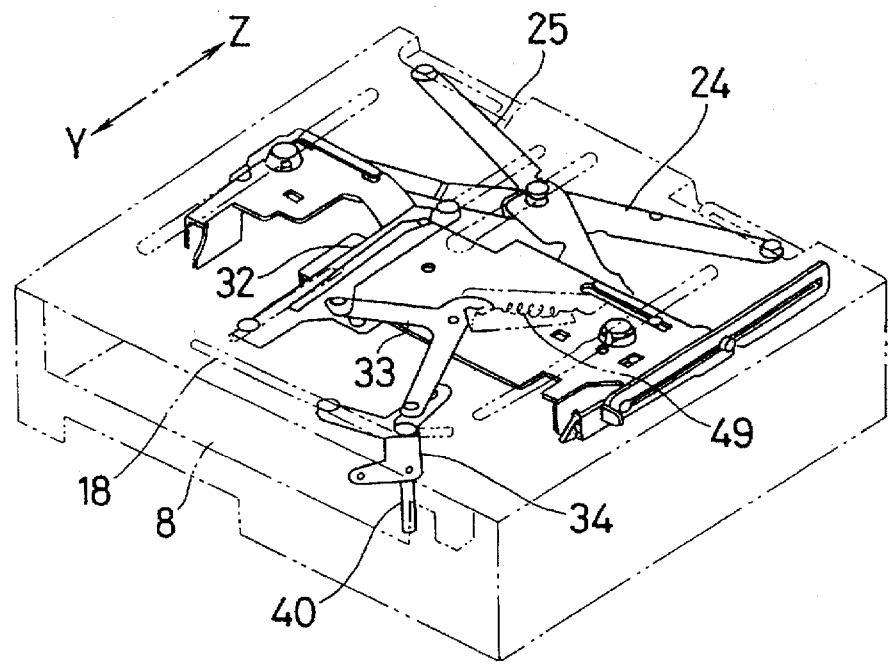
FIG. 13a is a perspective view showing the cartridge double-insertion preventing mechanism an its active state.
Figure 13B:
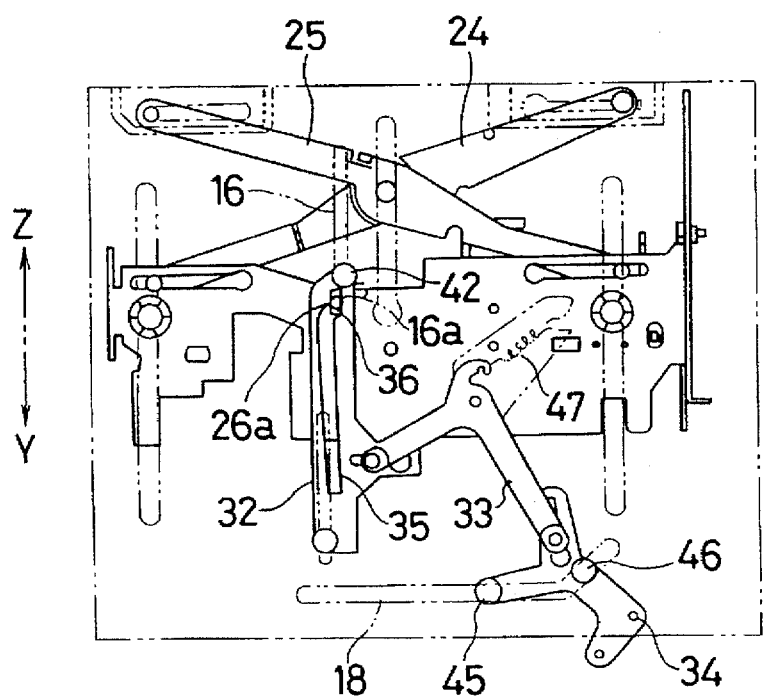
FIG. 13b is a plan view showing the cartridge double-insertion preventing mechanism in its active state.
Figure 14A:
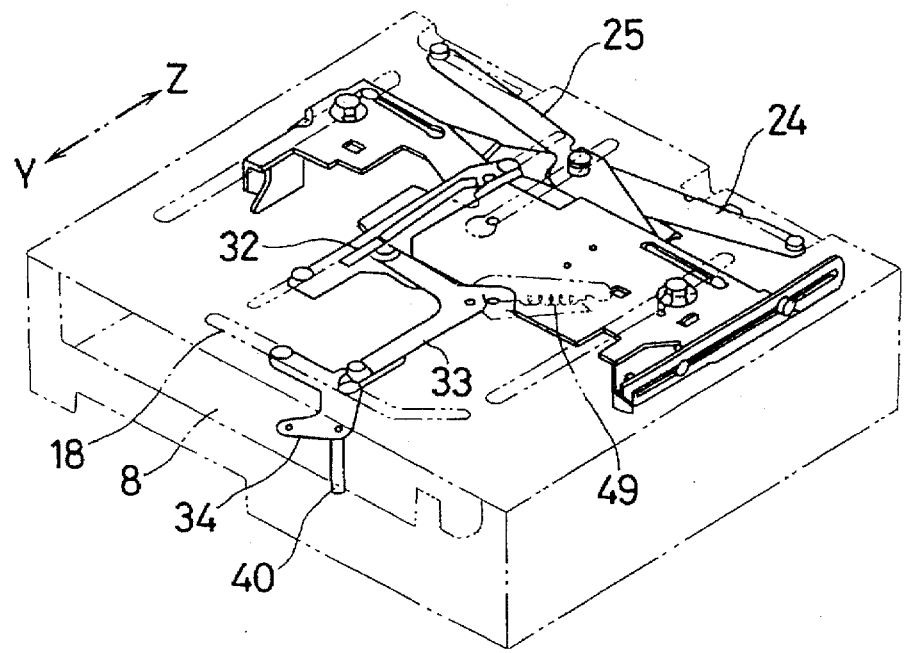
FIG. 14a is a perspective view showing the cartridge double-insertion preventing mechanism an its active state.
Figure 14B:
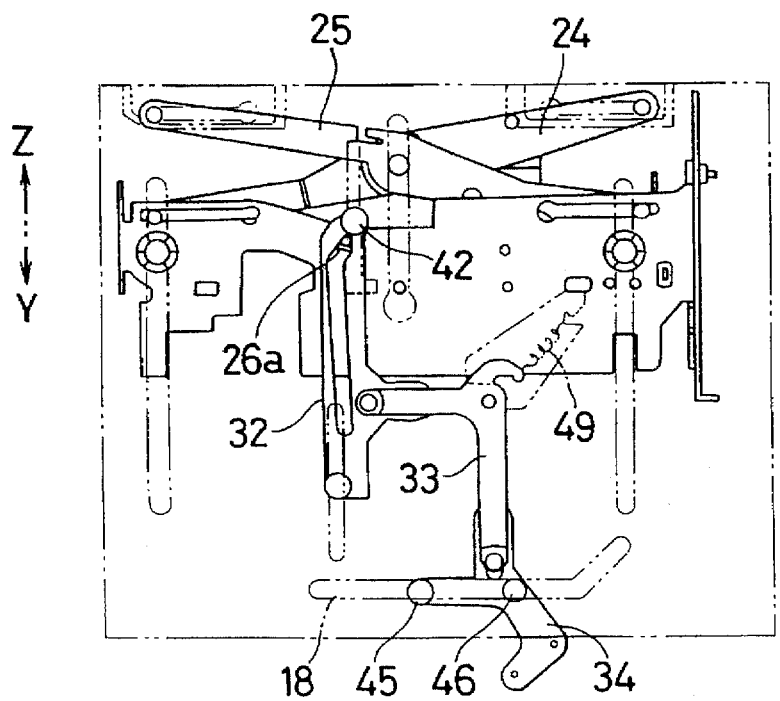
FIG. 14b is a plan view showing the cartridge double-insertion preventing mechanism in its active state.
Figure 15A:
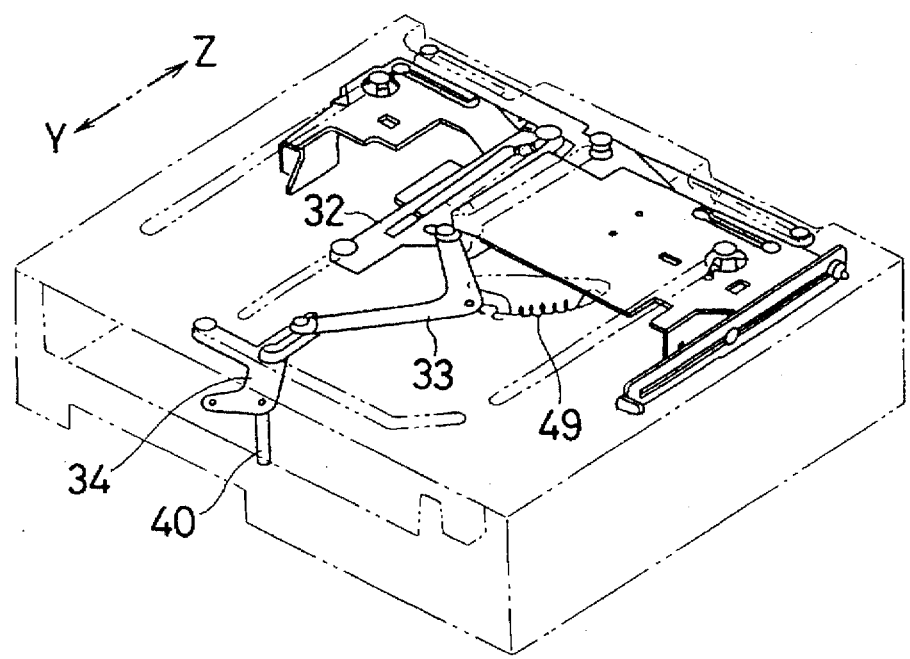
FIG. 15a is a perspective view showing the cartridge double-insertion preventing mechanism an its active state.
Figure 15B:
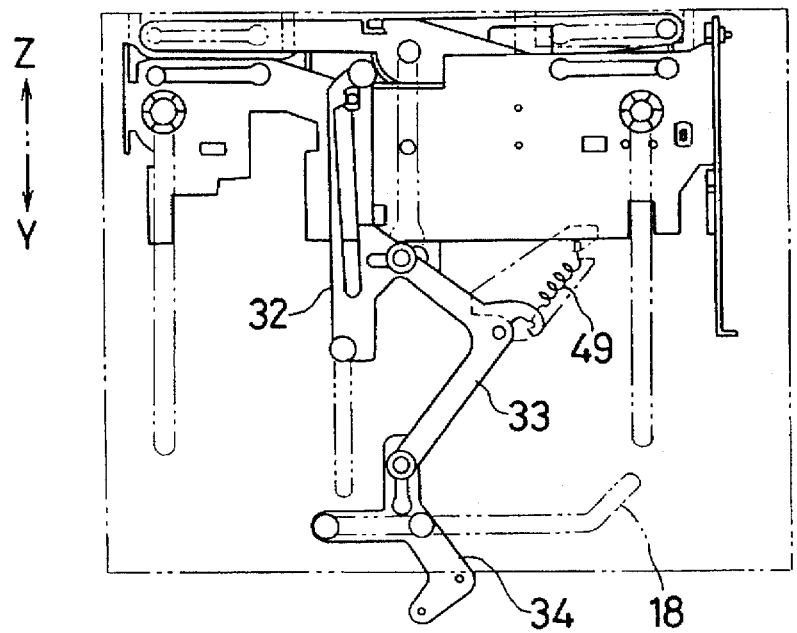
FIG. 15b is a plan view showing the cartridge double-insertion preventing mechanism in its active state.
Figure 16:
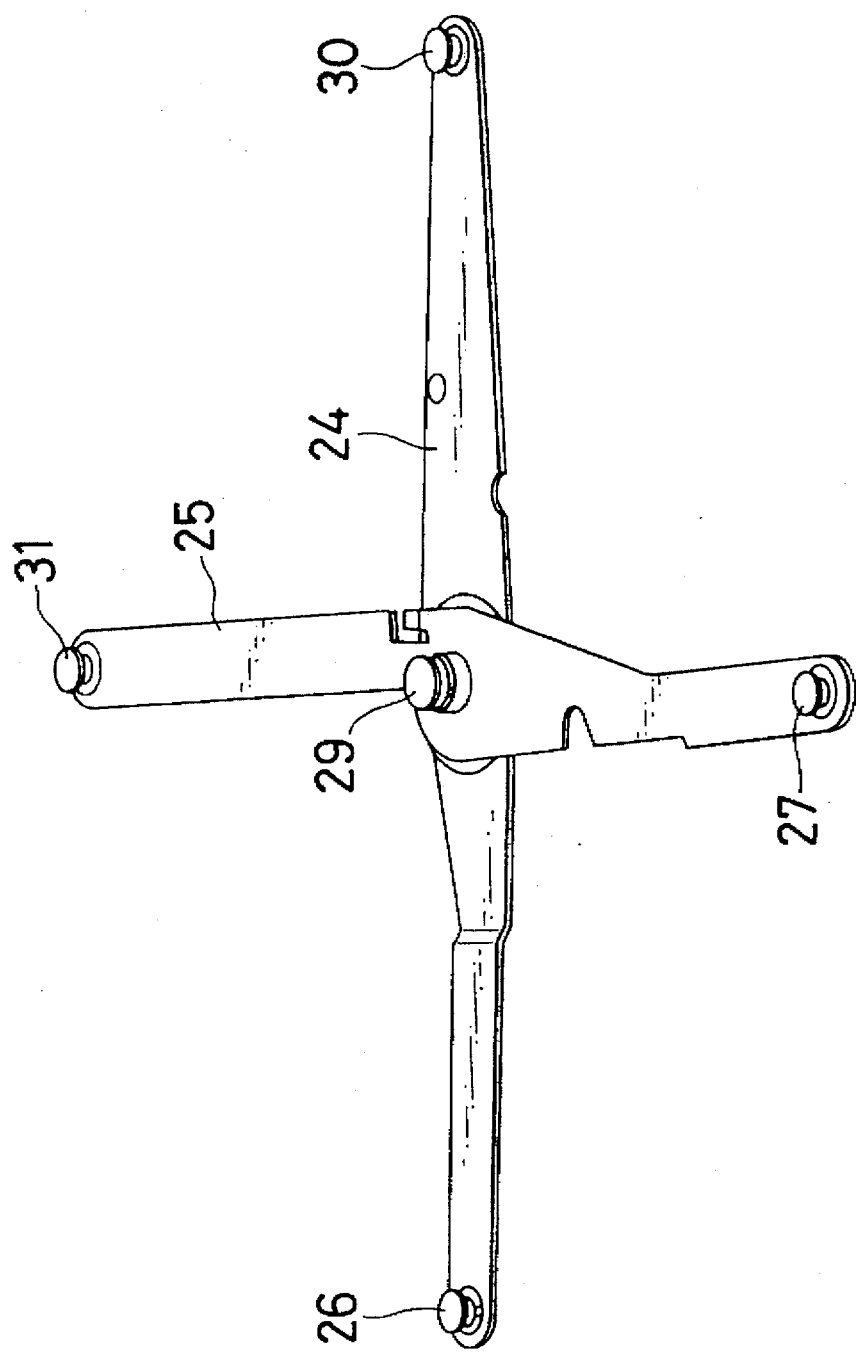
FIG. 16 is a perspective view showing the cross link.
Figure 17:
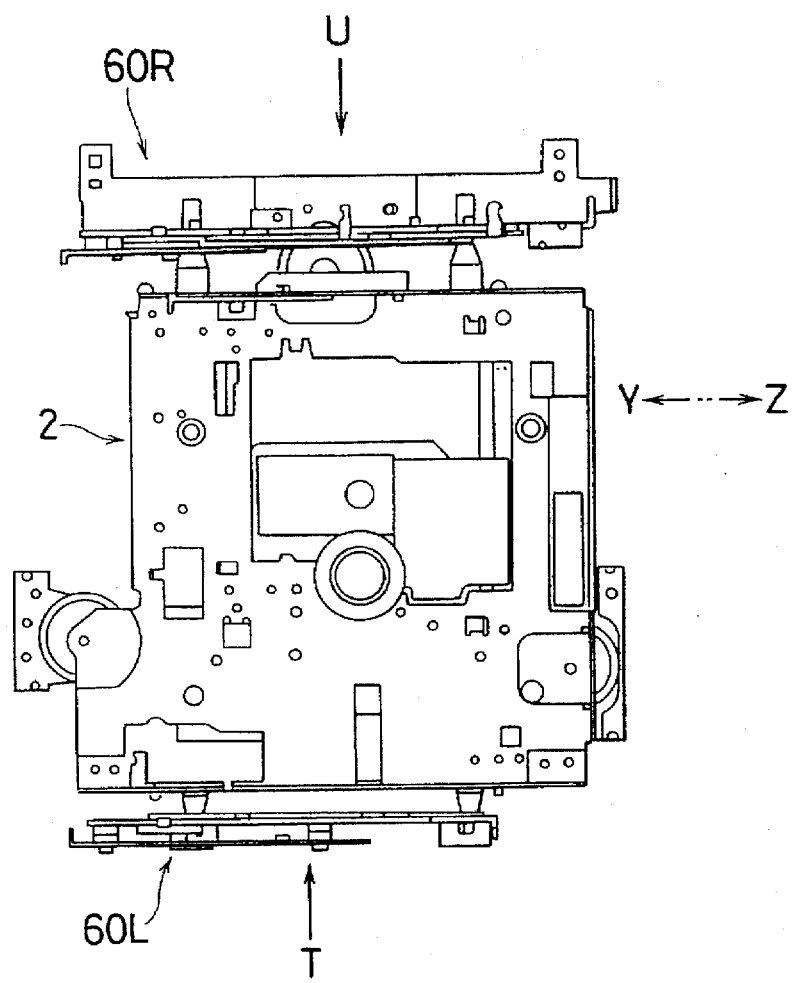
FIG. 17 is a plan view showing the suspension chassis assembly and the right and left mechanical lock units.

As the loader G moves rearward to transport horizontally the cartridge 300, the guide pin 26a rigidly attached to the loader G moves rearward along the guide slot 35 of the first connecting bar 32 and then reaches the cam face portion 36 of the slot 35 that deviates to the right (FIGS. 12a, 12b, 13a and 13b). In this course of operation, the rear guide pin 42 of the first connecting bar 32 comes off from the curved end portion 16a of the sixth guide slot 16 and the first connecting bar 32 shifts to the left and then moves rearward. Along with the movement of the first connecting bar 32, the second connecting bar 33 clockwise pivots against the urging the spring 49 as shown in FIGS. 13a and 13b, and the protector 34 moves from right to left. Since the guide pins 45, 46 are guided along the eighth guide slot 18 from right to left, the double-insertion preventing pin 40 at the front portion of the protector 34 comes forward and positioned approximately in the center of the cartridge entry opening 8 (FIGS. 12a, 12b, 13a and 13b). Insertion of more than one cartridge 200 is thus prevented.

Operation of the opening/closing mechanism of the dust cover 194

Figure 46A:
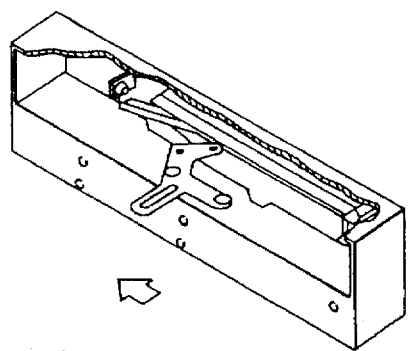
FIGS. 46a through 46e are perspective views showing the dust cover driving mechanism in its active state.
Figure 46B:
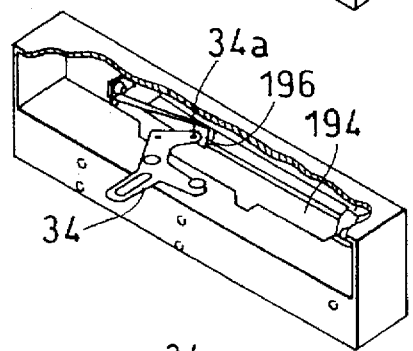
Figure 46C:
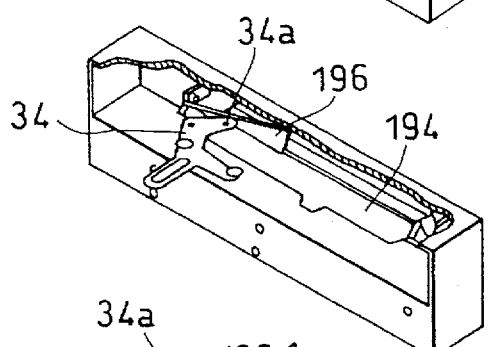
Figure 46D:
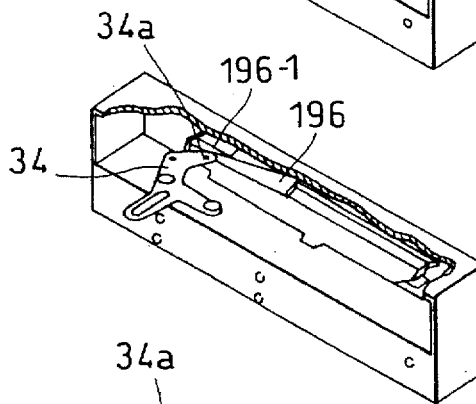
Figure 46E:
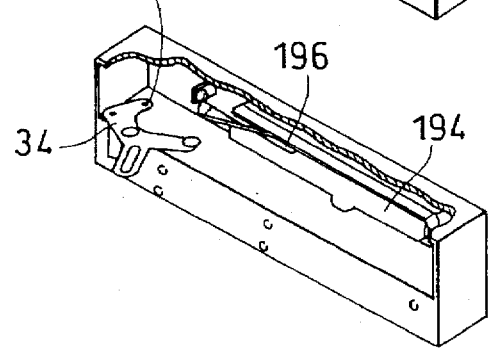
Figure 47:
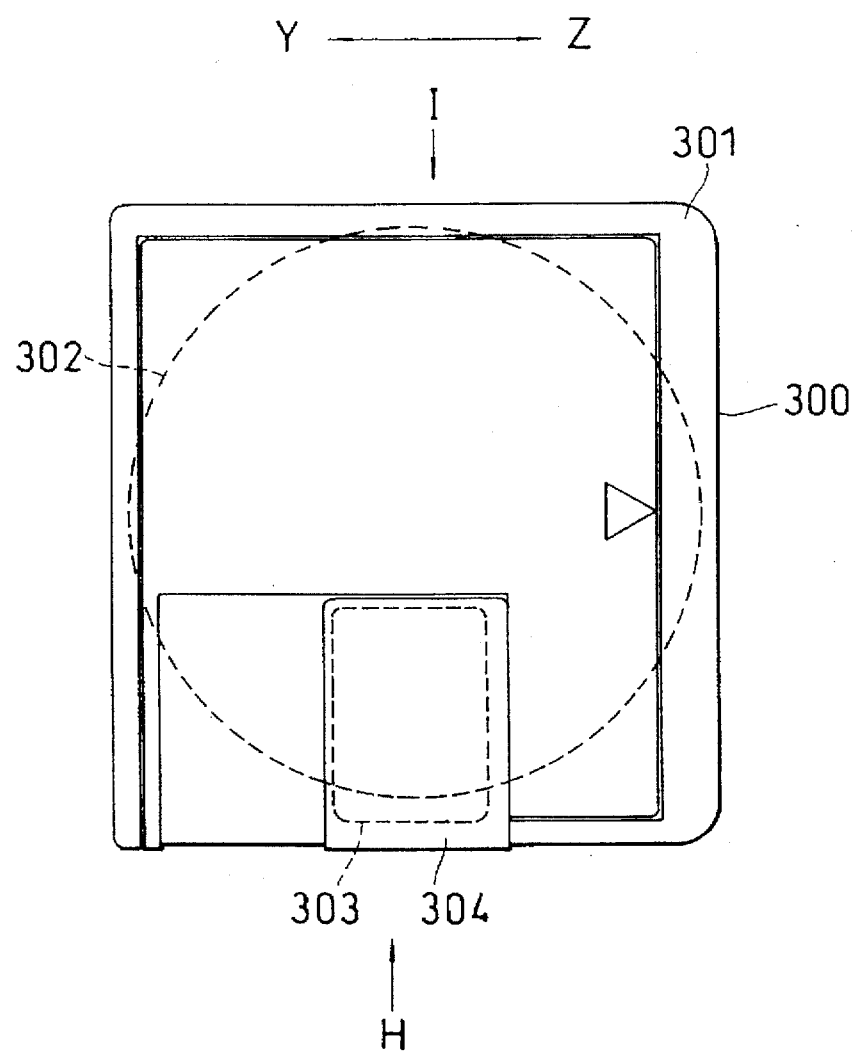
FIG. 47 is a plan view showing the top side of the cartridge.
Figure 48:
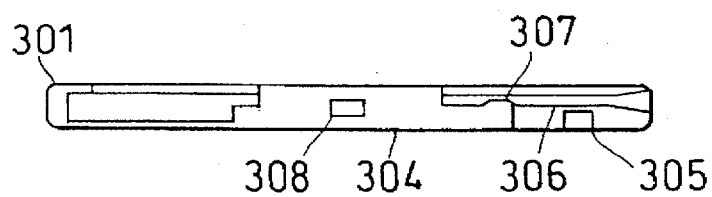
FIG. 48 is a view showing the cartridge as viewed in the direction of the arrow H in FIG. 47.

The opening/closing operation of the dust cover 194 is performed in synchronization with the operation of the cartridge double-insertion preventing mechanism A. Prior to the operation of the protector 34 as shown in FIG. 46e, the dust cover 194 closes the cartridge front entry 193. When the protector 34 starts operating with the loader G moving, the front end 34a of the protector 34 touches the base portion 196-1 causing the cam 196 to turn by approximately 90° and the dust cover 194 to open as shown in FIG. 46c.

As the protector 34 moves from right to left, the front end 34a of the protector 34 follows the twist of the cam 196. According the cam 196, the dust cover 194 is gradually closed. When the double-insertion preventing pin 40 of the protector 34 reaches the center of the cartridge entry opening 8, the front end 34a of the protector 34 comes off from the cam 196 and the dust cover 194 thus closes the cartridge entry opening 193 (FIGS. 46c, 46b and 46a).

When recording or reproducing is complete, the loader G reverses the above operation to eject the cartridge and lock the suspension chassis assembly 2.

Reverse operation of the loader G

Reverse rotation of the driving motor 121 is transmitted, via the worm gear 123, the worm wheel 124 and the gear series 125, to the pinion with which the loader G is meshed at the rack portion 52. The loader G thus moves frontward.

Reverse operation of the cartridge double-insertion preventing mechanism A

As the loader G moves frontward, the guide pin 26a rigidly attached onto the loader G comes off from the leftward deviated cam portion 36 of the guide slot 35 and moves forward along the guide slot 35 of the first connecting bar 32. The rear guide pin 42 of the first connecting bar 32 comes into the curved end portion 16a of the sixth guide slot 16. The first connecting bar 32 thus shifts rightward and forward. Along the movement of the first connecting bar 32, the second connecting bar 33 counterclockwise pivots by the urging of the spring 49, shifting the protector 34 from left to right. This causes the double-insertion preventing pin 40 of the protector 34 to move rightward from the cartridge entry opening 8 into the stationary chassis assembly 1.

Reverse operation of the opening/closing mechanism of the dust cover 194

Along with the reverse operation of the cartridge double-insertion preventing mechanism A, the front end 34a of the protector 34 starts from the position where it is clear of the cam 196 and moves along the cam 196 according to a series of steps shown in FIGS. 46a through 46e in that order until the dust cover 194 is opened.

Ejecting operation of the cartridge 300

As the loader G moves forward, the notches 51L, 51R of the holder pin locking portions 50L, 50R in the loader G push the holder pins 142, 145 forward, thereby pushing the holder 143 and the cartridge 300 forward. With the holder 143 moving forward, the holder pins 142, 145 are returned from the downward extending slots 137, 139 into the guide slots 136, 138 of the left and right guide portions 134, 135. In this course of operation, the holder pins 142, 145 raise the holder press members 162 against the urging of the springs, with the holder pins 142, 145 returning to the guide slots 136, 138 from the downward extending slots 137, 139. The holder press members 162 are returned to their original positions.

The center of the cartridge 300 is thus disengaged with the turntable 132. The cartridge 300 is guided forward along the left and right holder guides 134, 135, and ejected from the cartridge socket block 158 through the cartridge entry opening 8.

Closing operation of the slider shutter 304 of the cartridge 300

When the cartridge 300 is ejected, the locking portion 156b at the end of the shutter closure spring 156 is engaged in the shutter control hole 308. The forward movement of the holder 143 closes the shutter 304. The shutter lock releasing pawl 155 of the shutter opener 149 is disengaged from the shutter locking member of the cartridge 300, causing the shutter locking member to be projected. The stopper 307 of the slide shutter 304 is put into engagement with the shutter locking member. The locking portion 156b at the end of the shutter closure spring 156 is thus disengaged from the shutter control hole 308.

Locking operation of the suspension chassis assembly 2

When the cartridge 300 is ejected, the forward movement of the loader G causes the slant face 212a of the left cam portion 212 of the loader G to touche the lock cam shaft 81 of the left mechanical unit 60L, causing the lock cam 78 to pivot. The pin 80 rigidly attached onto the lock cam 78 moves the lock plate 62 forward. The lock portions 74, 75 located on the lock plate 62 press the left lock pins 130L, 131L in the suspension chassis assembly 2 against the edges of the openings 70, 71 in the lock guide 63. The lock pins 130L, 131L are thus engaged.

At the same time, the forward movement of the loader G causes the slant face 201a of the right cam portion 201 of the loader G to touch the lock cam shaft 115 of the right mechanical unit 60R, causing the lock cam 113 to pivot. The pin 114 rigidly attached onto the lock cam 113 moves the lock plate 88 forward. The lock portions 101, 102 located on the lock plate 88 press the right lock pins 130R, 131R in the suspension chassis assembly 2 against the edges of the openings 90, 91 in the lock guide 87. The lock pins 130R, 131R are thus engaged.

Operation of the opening/closing mechanism of the dust cover 194

When the front end 34a of the protector 34 comes off from the cam 196, the dust cover 194 closes the cartridge entry opening 193 (FIG. 46a).

As discussed above, the present invention comprises the stationary chassis assembly, the movable chassis assembly supported through elastic members by the stationary chassis assembly and provided with the turntable and the pickup head, the mechanical lock mechanism located on the stationary chassis assembly, for releasably gripping lock pins of the movable chassis assembly to secure the movable chassis assembly to the stationary chassis assembly, the holder located on the movable chassis assembly, for holding the disk cartridge to load or eject the disk cartridge, the loader located on the stationary chassis assembly, for transporting the holder in the predetermined transport direction, and pin driving means located on the loader, for disengaging the lock pins locked by the mechanical lock mechanism by touching the mechanical lock mechanism at the end of the loading operation of the disk cartridge, and for locking the lock pins with the mechanical lock mechanism by touching the mechanical lock mechanism at the beginning of ejecting of the disk cartridge, whereby guide slots are along the transport direction on the planar portion of the stationary chassis assembly, one end of each of a pair of pivoting cross links that are connected at their crossing parts in the middle portions thereof by an axis pin is slidably engaged with a guide slot formed in the loader, the other end of each of the pair of pivoting cross links is slidably engaged with a guide slot formed in the stationary chassis assembly, and the fulcrum pin is slidably engaged with a guide slot formed in the stationary chassis assembly. In the above arrangement, the cross links slide each of their ends and the fulcrum pin that connects the pair of cross links at their crossing portions along the guide slots in the stationary chassis assembly. The crossing portions of the pair of cross links are thus free from transverse motion with the loader moving in its transport direction. This stabilizes the load at the motor driving point. Disadvantages such as variations in motor speed or a halt in motor rotation are avoided. Stable operation of the motor is thus assured.

The stationary chassis assembly is provided with the cartridge double-insertion preventing mechanism in which the cartridge double-insertion preventing member is positioned at the cartridge entry opening in the stationary chassis assembly after the loading of the disk cartridge by the holder. Once the cartridge is loaded, an insertion of a second cartridge is prevented. Any physical damage involved in the insertion of the second cartridge is thus avoided.

The present invention comprises the stationary chassis assembly, the movable chassis assembly supported through elastic members by the stationary chassis assembly and provided with the turntable and the pickup head, the mechanical lock mechanism located on the stationary chassis assembly, and releasably gripping lock pins of the movable chassis assembly in order to secure the movable chassis assembly to the stationary chassis assembly in a detachable manner, the holder located on the movable chassis assembly for holding the disk cartridge in order to load or eject the disk cartridge, the loader located on the stationary chassis assembly for transporting the holder in the predetermined transport direction, and pin driving means located on the loader for disengaging the lock pins locked by the mechanical lock mechanism by touching the mechanical lock mechanism at the end of the loading operation of the disk cartridge and for locking the lock pins with the mechanical lock mechanism by touching the mechanical lock mechanism at the beginning of ejecting of the disk cartridge, the abutment portion that abuts the disk cartridge when the disk cartridge is incorrectly inserted, and the cartridge correct-insertion sensor mechanism. Therefore, when an attempt is made to incorrectly insert the disk cartridge, the abutment portion interferes with the disk cartridge rendering cartridge insertion impossible. Loading operation is not activated in the case of the cartridge disk incorrectly seated. Any damage to the disk cartridge or the apparatus is prevented.

Since the cartridge correct-insertion sensor mechanism is provided, a correct cartridge insertion is recognized when the sensor switch is activated by a correctly inserted cartridge.

What is claimed is:

1. A disk apparatus comprising:

a stationary chassis assembly, a movable chassis assembly supported through elastic members to the stationary chassis assembly, and provided with a turntable and a pickup head, a mechanical lock mechanism which is located on the stationary chassis assembly, for releasably gripping lock pins of the movable chassis assembly, so as to secure the movable chassis assembly to the stationary chassis assembly, a holder located on said movable chassis assembly, for holding a disk cartridge in order to load or eject the disk cartridge, a loader located on the stationary chassis assembly, for transporting the holder in a predetermined transport direction, and pin driving means located on the loader for disengaging lock pins locked by the mechanical lock mechanism by touching the mechanical lock mechanism at the end of the loading operation of the disk cartridge, and for locking the lock pins with the mechanical lock mechanism by touching the mechanical lock mechanism at the beginning of the ejecting operation of the disk cartridge, whereby a first guide slot is located along the transport direction in the surface portion of the stationary chassis assembly, one end of each of a pair of pivoting cross links that are coupled at their crossing parts in the middle portions thereof by a fulcrum pin is slidably engaged with a guide slot formed in the loader, the other end of each of the pair of pivoting cross links is slidably engaged with second and third guide slots formed in the stationary chassis assembly, and the fulcrum pin is slidably engaged with the first guide slot formed in the stationary chassis assembly.

* * * * *